United States Patent
Mukherjee et al.

(10) Patent No.: US 6,195,685 B1
(45) Date of Patent: Feb. 27, 2001

(54) FLEXIBLE EVENT SHARING, BATCHING, AND STATE CONSISTENCY MECHANISMS FOR INTERACTIVE APPLICATIONS

(75) Inventors: Bodhi Mukherjee, Wappingers Falls; Srinivas Prasad Doddapaneni, White Plains, both of NY (US); Sumeer Kumar Bhola, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/083,702

(22) Filed: May 22, 1998

(51) Int. Cl.$^7$ ............................ G06F 15/16; G06F 15/163
(52) U.S. Cl. ............................................. 709/205; 709/330
(58) Field of Search ................................... 709/204–205, 709/315, 330

(56) References Cited

U.S. PATENT DOCUMENTS

| | | | |
|---|---|---|---|
| 5,008,853 | 4/1991 | Bly et al. | 364/900 |
| 5,446,842 | 8/1995 | Schaeffer et al. | 395/200.01 |
| 5,583,993 | 12/1996 | Foster et al. | 395/200.04 |
| 5,625,809 | 4/1997 | Dysart et al. | 395/614 |

(List continued on next page.)

OTHER PUBLICATIONS

R. Kordale et al., "Object Caching in a CORBA Compliant System", The USENIX Association, Computing Systems, Title Page, pp. 377–404, vol. 9, No. 4, Fall 1996.

(List continued on next page.)

*Primary Examiner*—Zarni Maung
*Assistant Examiner*—Andrew Caldwell
(74) *Attorney, Agent, or Firm*—Wayne L. Ellenbogen

(57) ABSTRACT

A system, method and computer program storage device providing event and/or state sharing support e.g., for building object-oriented interactive groupware in wide-area distributed environments (such as the Internet). For collaborative applications programmed using events, mechanisms are provided for sharing application-specific events. For example: an event based programming model allows applications to post an event and triggers corresponding ERUs (Event Reaction Unit) in reaction to a received event; preconditions for control activation of ERUs; and event consistency policy objects implement application specified event consistency model. Some policy examples are: a policy in which event order is not guaranteed, but all events are guaranteed to be sent to the ERUs eventually; and a policy that first triggers local ERUs and then posts the event to the server. An out-of-order event is detected using the event notification from the server; and an automatic detection of out-of-order events seen by ERUs in the local workstation in this optimistic event execution model. For applications requiring support for state sharing, an asynchronous model for updating replicated state, which supports atomicity of updates across multiple shared objects is described. Coupled with a flexible marshaling framework, this allows existing application data-structure classes to be easily extended and made shareable, while providing support for context-sensitive state marshaling applications. To solve the problem of replica consistency, a novel combination of three mechanisms is used: global locks; detection of incorrect update ordering; and cloning a subset of the shared objects for state re-initialization. To reduce network load due to fine-grained user interaction, a framework for application specified event batching, called Late Event Modification (LEM), enhances the event interface to allow applications to modify the event objects after posting them to the set.

21 Claims, 16 Drawing Sheets

U.S. PATENT DOCUMENTS

| | | | |
|---|---|---|---|
| 5,634,129 | | 5/1997 | Dickinson .......................... 395/683 |
| 5,694,544 | | 12/1997 | Tanigawa et al. ............. 395/200.04 |
| 5,737,607 | * | 4/1998 | Hamilton et al. ........................ 717/1 |
| 5,905,890 | * | 5/1999 | Seaman et al. ...................... 709/304 |
| 5,913,061 | * | 6/1999 | Gupta et al. ......................... 709/300 |
| 5,915,098 | * | 6/1999 | Palmer ................................. 709/247 |
| 5,987,497 | * | 11/1999 | Allgeier ............................... 709/201 |
| 5,999,986 | * | 12/1999 | McCauley, III et al. ........... 709/315 |
| 6,032,199 | * | 2/2000 | Lim et al. ............................ 709/316 |
| 6,058,416 | * | 5/2000 | Mukherjee et al. ................. 709/203 |
| 6,067,578 | * | 5/2000 | Zimmerman et al. .............. 709/315 |

OTHER PUBLICATIONS

A. Prakash et al., "DistView: Support for Building Efficient Collaborative Applications using Replicated Objects", pp. 153–164, CSCW 94—Oct. 1994 Chapel Hill, NC. USA, ACM (1994).

C. Schuckmann et al., "Designing object–oriented synchronous groupware with COAST", Computer Supported Cooperative Work '96, pp. 30–38, ACM(1996).

Robert Strom et al., "Concurrency Control and View Notification Algorithms for Collaborative Replicated Objects", IEEE, pp. 194–203, May 1997, (1997).

S. Greenberg et al., "Real Time Groupware as a Distributed System: Concurrency Control and its Effect on the Interface". pp. 207–217 CSCW 94—Oct. 1994 Chapel Hill, NC, ACM (1994).

J. Waldo et al., "Events in a n RPC Based Distributed System", Sun Microsystems Laboratories, Inc., pp. 17, (1995).

C.A. Elliset al., "Concurrency Control in Groupware Systems", ACM, 0–89791–371–5/89/0005/0399, pp. 399–407, (1989).

A. Karsenty et al., An Algorithm for Distributed Groupware Applications), IEEE, Jun. 1993, pp. 195–202. (1993).

J.F. Patterson et al., "Rendezvous: An Architecture for Synchronous Multi–User Applications", CSCW '90 Proceedings, Oct. 1990, pp. 317–328.

Y. Aahlad et al., "Asynchronous Notification Among Distributed Objects", USENIX Association, Conference on Object–Oriented Technologies and Systems, Jun. 17–21 1996, pp. 83–95.

K. Birman et al., "Lightweight Causal and Atomic Group", ACM Transactions on Computer Systems, vol. 9, No. 3, pp. 272–314, Aug. 1991.

A. Schmidt et al., "Internet Protocol TrafficAnalysis with Applications for ATM Switch Design", University of Illinois at Urbana–Champaign, 22 pages, (1992).

J. Bacon et al., "Using Events to Build Distributed Applications", University of Cambridge, United Kingdom, 15 pages, (1996).

H. Chiu et al., "Conferencing Metaphor", IBM Technical Disclosure Bulletin, vol. 36, No. 02, Feb. 1993.

* cited by examiner

FLEXIBLE EVENT SHARING, BATCHING, AND STATE CONSISTENCY MECHANISMS FOR INTERACTIVE APPLICATIONS

CROSS-REFERENCE TO RELATED PATENT APPLICATION

The present invention is related to patent application entitled "Flexible State Sharing and Consistency Mechanisms for Interactive Applications," by Mukherjee et al., filed of even date herewith, IBM U.S. Pat. No. 6,058,416. This application, which is commonly assigned with the present invention to the International Business Machines Corporation, Armonk, N.Y., is hereby incorporated by reference in its entirety into the present application.

FIELD OF THE INVENTION

This invention relates to distributed applications and more specifically to a system and method for providing event and state sharing support for building object-oriented interactive collaborative applications in wide-area distributed environments such as an intranet or the Internet.

BACKGROUND

With the ability to extend web browser functionality using JAVA (a trademark of Sun Microsystems), plugins, ACTIVEX (a trademark of MicroSoft), etc., simple interactive groupware applications are being made available to a wide population of users. Examples include Internet chat and simple white boards. However, for building complex object-oriented collaborative applications, developers need a simple and powerful programming model, which at the same time should allow good response time and efficient implementation in a wide-area distributed environment. Appropriate support for sharing state is critical for supporting collaborative applications. In wide-area environments, replication of state is used to improve response time. Also, there are instances where a more primitive mechanism like event notification (also called event sharing) is a much better match for application requirements than state sharing. These high-level requirements for interactive groupware, coupled with replicated state, lead to three critical objectives that are addressed by the present invention.

OBJECTS OF THE INVENTION

1. Programming model: One objective, from a system design viewpoint is to decouple the programming model from any concurrency control implementation (including those of the present invention). For example, when an application issues an operation on a shared object, the system should have flexibility in scheduling this operation at the various replicas. This separation between the issuing of an operation and its execution leads to an asynchronous programming model that allows the system to employ a variety of concurrency control implementations such as pessimistic locking, ordering actions via a server, optimistic notification with automatic rollback and others. From the application developers viewpoint, the following requirements are considered:

Pipelining: It is desirable that an application be able to continue processing user input and initiate actions while its previous actions are being executed. This is useful, for example, when the user input is fine-grained, and a small response lag is acceptable, e.g., typing a few characters ahead of the echo. Depending on the lookahead permissible to a user, and the actual response time, this can allow for faster user interaction. The asynchronous model motivated by system needs also meets this requirement.

Atomicity: As single-user applications have no source of contention, there is no need to distinguish between a group of operations which are part of a single action and a series of actions. However, with multiple users, it is necessary to specify some group of operations as indivisible so that they are scheduled for execution at the same time, and to ensure that other operations are not interleaved with them. Hence, the programming model should support atomic actions that access multiple shared objects.

Support for legacy applications: It should be easy to convert existing single-user application data-structures into shared data using class extensions.

The present invention has features that provide an asynchronous model for specifying atomic operations on the shared state using update events. This model only requires shared objects and events to implement a simple Marshalable interface. This interface allows for powerful state sharing semantics which are not possible to implement with simpler interfaces like JAVA™ Object Serialization.

2. Consistency of shared state: Potential inconsistencies in the replicas can arise due to different ordering of the events at different processes. Most systems take two extreme approaches when dealing with consistency of replicated state, (1) a fully optimistic approach with rollbacks and reexecution, and (2) a pessimistic approach utilizing locking. The first approach frees the application programmer from the burden of consistency maintenance, but the effect of jitters in the user interface due to automatic rollback could be a problem. The second approach does not allow enough freedom of interaction. It has been observed that strict locking is usually not necessary for collaborative applications because of implicit social protocols employed by collaborating users.

The present invention uses an intermediate approach of optimistic execution along with a combination of three mechanisms which flexibly expose the application writer to more of the distributed nature of the application:

a. Global Locks: can be used by the application to enforce correct ordering;

b. Detection of Conflicts: the system detects conflicts due to incorrectly ordered updates and informs the application; and c. Cloning and Re-initialization: the application can use this to construct an application specific conflict resolution policy.

3. Application specific event batching: Fine-grained user interaction with a GUI leads to a lot of updates on the shared state. For efficiency reasons, all these updates should not be propagated to the other users in the collaboration. The present invention uses a novel event batching technique (Late Event Modification) to resolve this tension between interactivity and performance.

SUMMARY

The foregoing and other objectives are realized by the present invention, which provides a system and method for event and state sharing support for building object-oriented interactive applications in wide-area distributed environments (such as an intranet or the Internet).

One embodiment of the present invention is implemented as middleware that provides support for different classes of distributed collaborative applications over the Internet. It provides an extensible set of mechanisms for event sharing and/or state sharing among a group of distributed objects to suit the requirements of individual applications.

The system can support both symmetrical and asymmetrical collaborative applications. A symmetrical collaborative application is one which the sets of collaborative objects in each location are identical in their choice of consistency and transport options for sharing of events and application state, whereas an asymmetrical collaborative application may have different consistency and transport options.

The system can also support for configurable collaboration teams. Each team has a policy object implementing its type. Applications can program behavior of a team by implementing an appropriate team policy.

In another embodiment, for collaborative applications programmed using events, mechanisms are provided for sharing application-specific events. For example:

an event based programming model allows applications to post an event and triggers corresponding ERUs (Event Reaction Unit) in reaction to a received event.

support for preconditions for controlling activation of event handlers (ERUs)

event consistency policy objects that implement application specified event consistency model are provided. For example, a policy in which event order is not guaranteed, but all events are guaranteed to be sent to the ERUs eventually.

a policy that first triggers local ERUs and then posts the event to the server. An out-of-order event is detected using the event notification from the server.

an automatic detection of out-of-order events seen by ERUs in the local workstation in this optimistic event execution model.

In a system wherein one or more distributable components of a collaborative application may be executed independently and collaborate with other Components and wherein each component includes a set of one or more event reaction units (ERU), an example of a method for sharing events having features of the present invention includes the steps of: receiving a shared event from an application component over the network; comparing the received event with one or more preconditions associated with each ERU, wherein the precondition specifies one or more reference events that trigger a corresponding reaction; and triggering the reaction, which may perform any computation or task and may produce other events.

In yet another embodiment for applications requiring support for shared state and an application specified state resolution policy, the invention provides a conflict detection mechanism for a shared set of objects. For example:

an asynchronous model for specifying atomic updates to the shared state.

a set abstraction to represent a group of related shared objects.

an object can be added or deleted from a set.

objects in a set can have pointers to other objects in the same set, which can be cyclic.

applications in a collaboration can dynamically join or leave a set.

all the objects in a set are fully replicated at all the applications that have joined that set.

In yet another embodiment, for applications requiring support for shared state and an automatic state resolution policy, it provides a novel "cloning and re-initialization" mechanism. For example:

applications can make a copy of a subset of objects in the set.

pointers from inside the original subsets to objects outside are preserved in the cloned subset.

references between objects inside the original subset are mapped into the cloned subset.

cloned subset can be exported to other clients.

an object set in error can be re-initialized using a cloned set.

In still another embodiment, for application requiring fine-grained user interaction with a GUI (which leads to a lot of updates on the shared state), a novel event batching framework (LEM) is provided to resolve the tension between interactivity and performance. For example:

applications can modify, delete or compress the event objects after posting them to the set.

two mechanisms are provided to control when an event is posted to the network (1) explicitly, by invoking a method and (2) implicitly, by using a time-out value.

In yet another embodiment, for applications requiring context sensitive marshaling of the state of its objects, a lightweight yet powerful marshaling framework is provided.

BRIEF DESCRIPTION OF THE DRAWINGS

The invention will now be described in greater detail with reference to the appended drawings wherein.

DETAILED DESCRIPTION

Figure 1:
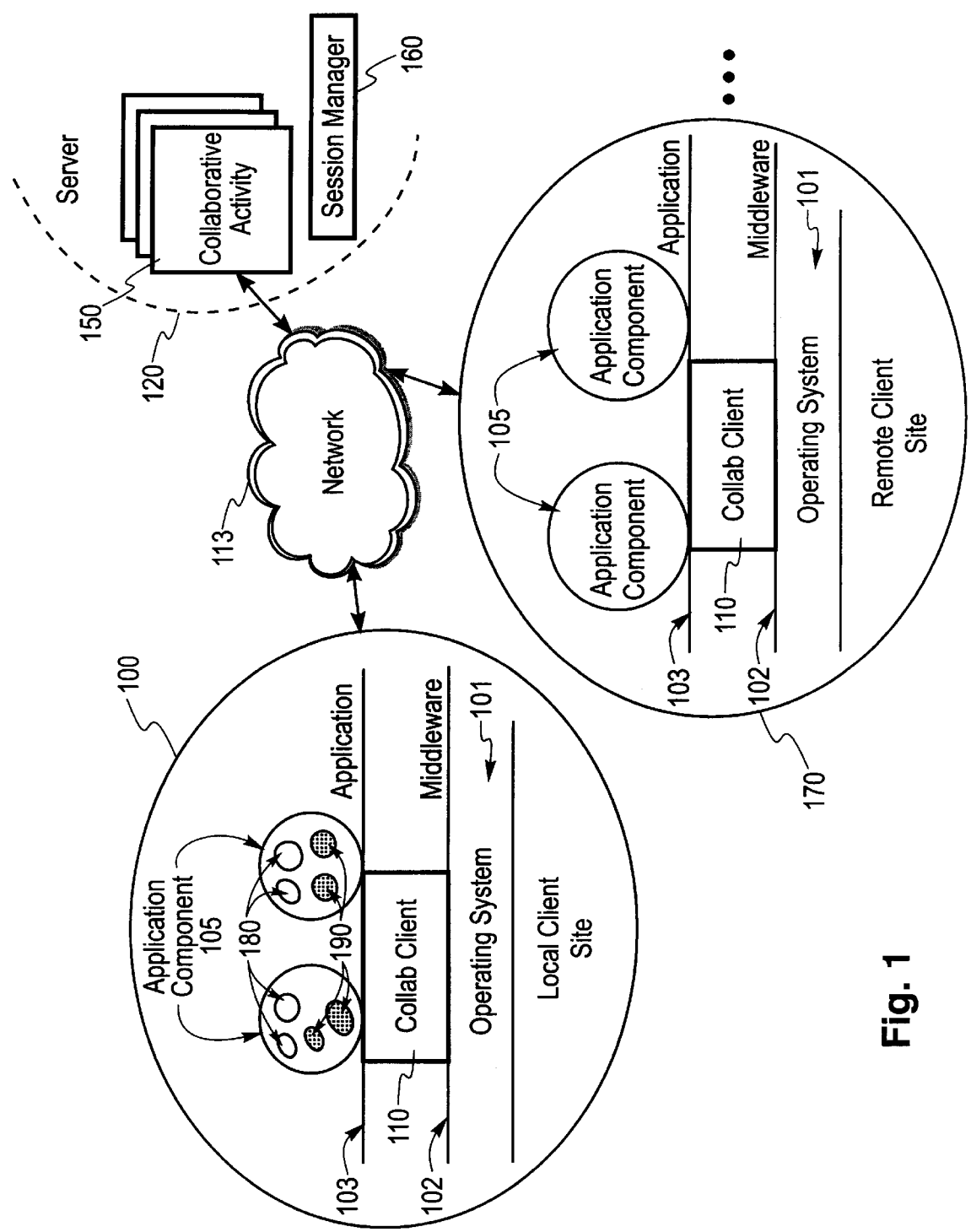
FIG. 1 depicts an example of a system having features of the present invention.

FIG. 1 depicts an example of a system having features of the present invention. As depicted, the system includes a local client site 100, one or more remote client sites 170 and a server 120, which are connected using a network 113. The network is used to communicate messages between clients and the server using a network specific protocol. For example, when the Internet is used as the network, the TCP/IP protocol is used for communication. For clarity, only the relevant components resident in the memory of the clients 100, 170 and server 120 are shown.

The server 120 (either a client machine can be used to run the server 120, or a dedicated server machine can be used) maintains a set of collaborative activities 150 (described in more detail in FIG. 2), one for each active collaboration. The server 120 identifies clients in a collaboration, for example, using their Internet addresses. The server 120 may maintain relevant information about a client such as geographical location (used for efficient multicast protocols), the number of connections to the server 120 and the collaborations that a client 100, 170 is participating in.

Each local client site 100 includes an operating system layer 101, a middleware layer 102, and an application layer 103. The operating system layer 101 can be any available computer operating system such as AIX, MVS (trademarks of IBM) WINDOWS 95, WINDOWS NT (trademarks of MicroSoft), SUN OS, SOLARIS, and JAVA OS (trademarks of Sun Microsystems).

The client includes one or more distributable building blocks ("Components") 105 of a collaborative application 103, wherein each Component 105 may be executed independently and collaborate with other Components. Each Component includes a set of one or more Event Reaction Units (ERU), wherein each ERU has an associated precondition and a reaction. The precondition specifies one or more reference events that trigger the reaction, which may perform any computation or task and may produce other events.

A preferred embodiment of the present invention includes features implemented as software tangibly embodied on a computer program product or program storage device for execution on a processor (not shown) provided with client 100, 170 and server 120. For example, software implemented in a popular object-oriented computer executable code such as JAVA provides portability across different platforms. Those skilled in the art will appreciate that other procedure-oriented and object-oriented (OO) programming environments, such as C++ and Smalltalk can also be employed.

Those skilled in the art will also appreciate that methods of the present invention may be implemented as software for execution on a computer or other processor-based device. The software may be embodied on a magnetic, electrical, optical, or other persistent program and/or data storage device, including but not limited to: magnetic disks, DASD, bubble memory; tape; optical disks such as CD-ROMs; and other persistent (also called nonvolatile) storage devices such as core, ROM, PROM, flash memory, or battery backed RAM. Those skilled in the art will appreciate that within the spirit and scope of the present invention, one or more of the components instantiated in the memory of the clients 100, 170 or server 120 could be accessed and maintained directly via disk (not shown), the network 113, another server, or could be distributed across a plurality of servers.

An example of a program storage device readable by a machine, tangibly embodying a program of instructions executable by the machine to perform method steps for sharing events in a system wherein one or more distributable components 105 of a collaborative application 103 may be executed independently and collaborate with other components 105 and wherein each component 105 includes a set of one or more event reaction units (ERUs) 180, includes the steps of: receiving a shared event from an application component over the network; comparing the received event with one or more preconditions associated with each ERU 180, wherein the precondition specifies one or more reference events that trigger a corresponding reaction; and triggering the reaction, which may perform any computation or task and may produce other events.

The middleware layer 102 implements domain specific system infrastructures on which applications can be developed. As is conventional, the middleware 110 is communicatively coupled to the application and to the network, and is adapted to communicate to and receive messages from one or more remote clients over the network 113. The Collaborative Client ("collab client") 110, the client side of the system (described in more detail in FIG. 4), preferably belongs to the middleware layer. The collab client 110 receives asynchronous distributed shared events from the network and delivers a received event to an associated Component 105.

Figure 6:
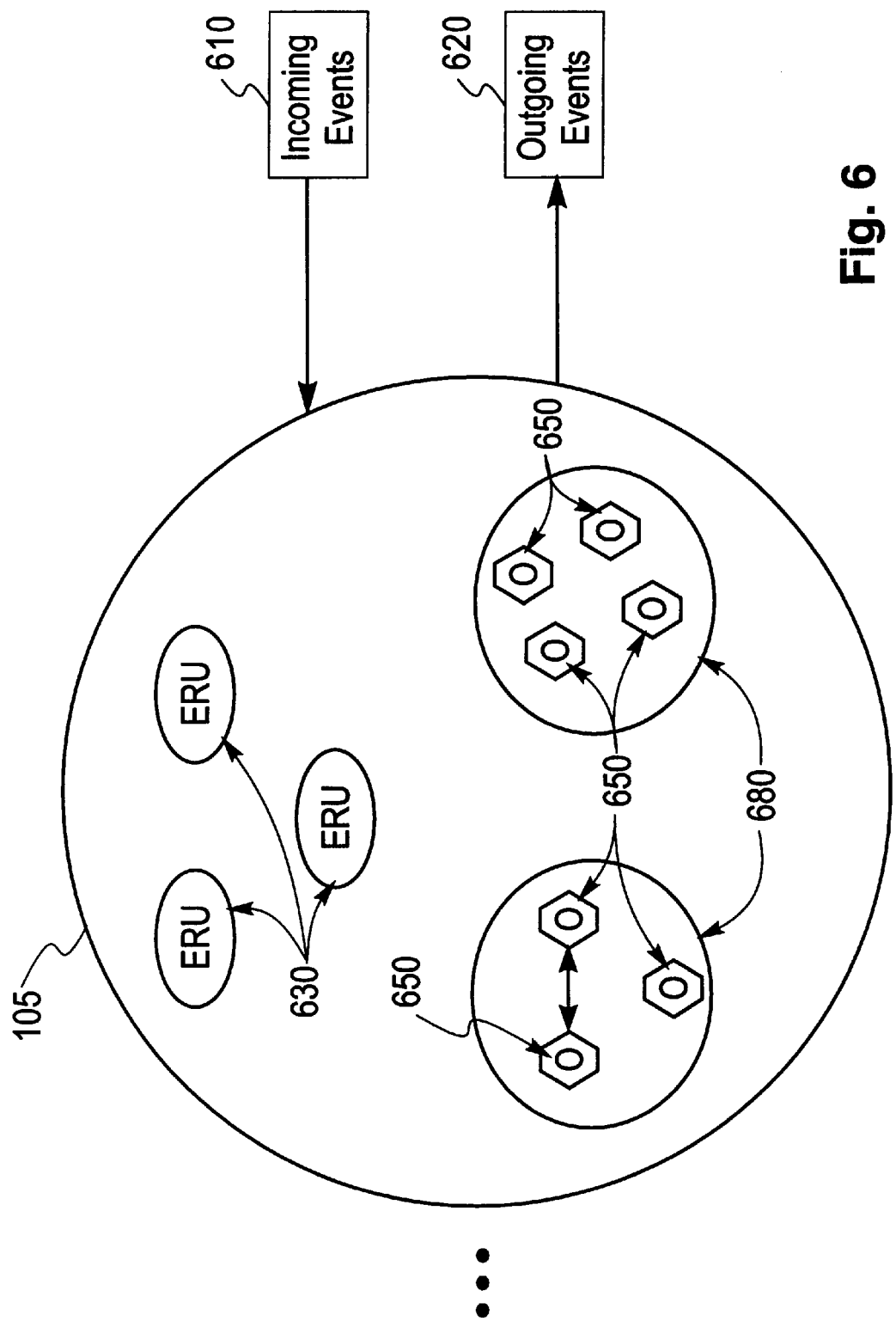
FIG. 6 depicts an example of the Application Components of FIG. 1.

The application layer 103 includes application components 105 which collaborate using one or more sets of shared objects 190 and/or event reaction units 180 (described in more detail in FIG. 6). Examples of a few specific application components such as auctioning components and drawing components are discussed in detail later.

The system described in this invention can be implemented on a variety of network platforms 113. By way of example only, a local area network (LAN) setup could be constructed using SUN ULTRA 1 machines connected by fast Ethernet. Similarly, another local area network setup could be constructed using IBM RS/6000 (running AIX OS), and Personal Computers (running WINDOWS 95 OS) as clients 100, 170 connected to a high end RS/6000 machine as the server 120 using a 16 MB token ring network. An example of a wide area network uses SUN ULTRA 1 machines as clients 100, 170 and a SUN SPARCSTATION 20 as the server 120, connected via the Internet.

Collaborative Activity

An active collaboration in the system is encapsulated in a collab activity 150. Each activity has participants (also called clients). When a collaboration is created, a new collab activity 150 is instantiated and bound into a name space of the collaboration. This allows others to also have access to that activity, thus allowing them to join the collaboration.

Figure 2:
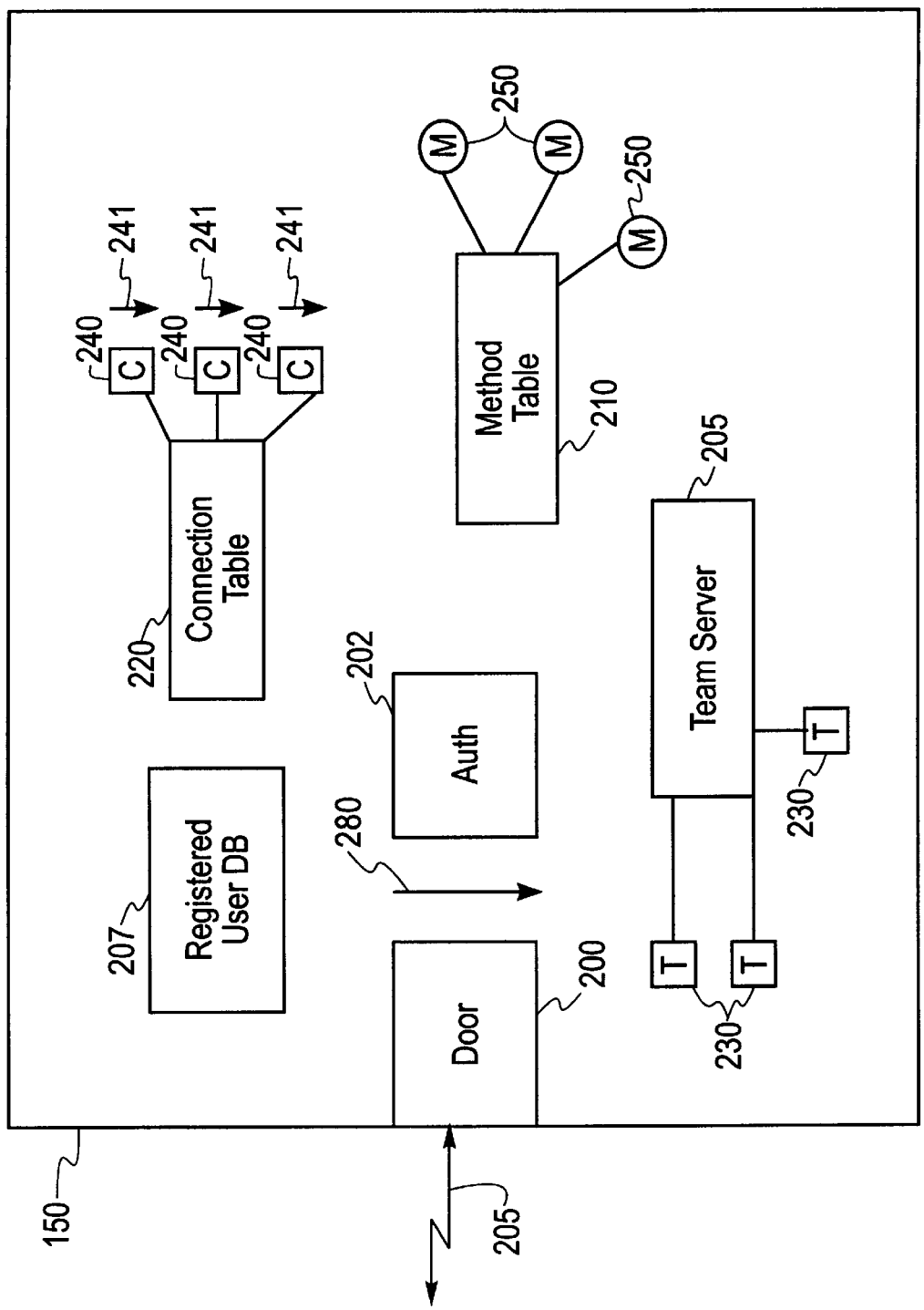
FIG. 2 depicts an example of a Collaborative Activity and selected information maintained in the Activity.

FIG. 2 depicts an example of the components of an activity 150. Depending on the type of collaboration (or application), an activity 150 can be instantiated with different implementations of these components. Thus, activities are highly configurable. A Door component 200 implements a named communication port which can be used by users to connect to an activity. For example, when a TCP/IP protocol is used over the Internet for communication, the Door 200 is realized using a named TCP/IP port [1]. For example, the door can be implemented by a method waitForClient( ) in a predefined interface that waits for incoming client connections 205. When no implementation of Door 200 is specified, a default implementation using the TCP/IP protocol can be used.

A new thread 280 is instantiated to monitor the incoming client connections 205 to an activity 150. Once a new client connection is received, the client can be authenticated using an Auth object 202. An Auth object implements an application specific authentication policy. Depending on its authentication requirements, an application 103 can implement an Auth object 202 by implementing an authenticate( ) method of a predefined interface. The most commonly used Auth objects (e.g., password authentication, and no-authentication) are provided by the system presented in this invention. Once a client is authenticated, a connection to the client is established, a client object 240 is created inside the activity, and a new thread from a pool of threads 241 is assigned to receive client requests. Again, depending on the protocol being used, an activity 150 uses an appropriate connection class to communicate with connected clients. For example, when the TCP/IP protocol is used, a connection class uses socket APIs to communicate with the clients. A conventional data structure called the client connection table 220 is used to hold the connections to active clients.

Each activity 150 maintains a database 207 of the clients currently participating in the collaboration. This database 207 allows queries on client information. The clients participating in a collaboration can be grouped in overlapping collaboration teams 230 and sub-teams. A team server 205 in an activity maintains a number of named teams. Teams can be dynamically created and destroyed and a client can join or leave a team.

Each activity also maintains a method table 210 including a set of registered methods 250 to provide application specific services. These services may include queries and updates of user databases 207, creation and update of collaboration teams and others. An activity 150 will need application specific implementation of these services. For example, unlike a public meeting, an anonymous meeting does not allow a client to query the names of all the participants. This can be achieved by registering the appropriate implementation of a method getUsersInTeam( ) with an activity.

A session manager 160 (FIG. 1) [2], which itself is a collaborative application, can be used to manage a set of concurrent activities and their participants. The way the session manager structures the activities and the resources in an activity, determines the metaphor of a collaboration server. The use of such metaphors are well known in the conferencing and collaboration arts (see e.g., H. Chiu et al., "Conferencing Metaphor," IBM TDB, V. 36, No. 32, (February 1993); and U.S. Pat. No. 5,634,129, issued May 27, 1997 to Dickinson et. al., entitled Object Oriented System for Representing Physical Locations, which are hereby incorporated herein by reference in their entirety). For example, a "room metaphor" (the default metaphor in one embodiment of the system), organizes the collaborative activities in separate rooms. A Drawing room contains collaborative drawing tools and a color printer, whereas an Auction room will contain ongoing auction activities. Similarly, a conference center metaphor will implement only one room containing at least two applications: "reserve a conference" and "join a conference". The system preferably uses a hierarchical naming scheme, similar to URLs, to name activities. For example, the activity 150 can be named using a server name and a room name (in case of the room metaphor). The teams 230 and sub-teams in an activity 150 can be similarly named.

Creating Collaboration Teams

The users in a collaboration can be grouped in overlapping collaboration teams 230 and sub-teams. Teams 230 are preferably lightweight entities which can be dynamically created and destroyed while a collaboration is in progress. Each team 230 has a unique name in the name space of an activity. Teams are preferably highly configurable. The behavior and performance of a team can be defined using a TeamPolicy object 330 per team (FIG. 5).

Figure 3:
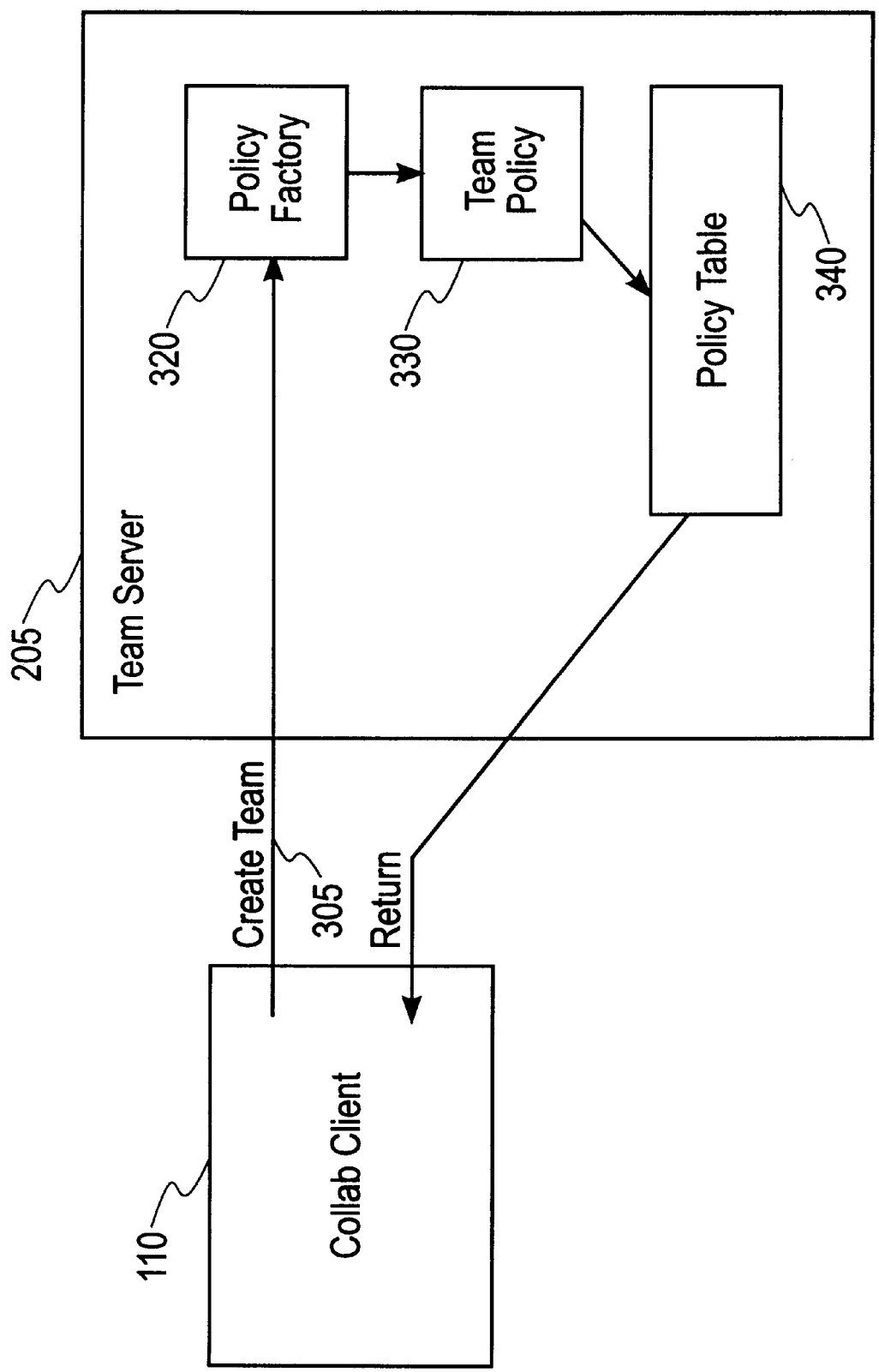
FIG. 3 depicts an example of the Team Server (of FIG. 2) and a logic flow for creating a collaboration team.

FIG. 3 depicts a more detailed example of the Team Server 205 and a logic flow for creating a collaboration team. As depicted, when a collab client 110 sends a request to the Team Server 205 to create a Team 230 of a certain type (the createteam method call 305), the team server uses its policy factory object 320 (the factory object knows how to create a policy of a certain type) to create a team policy object 330 for the specified team type. Once a team policy is instantiated and a team object is created, they are inserted into a policy table 340 which maps the created team to its policy object.

Figure 4:
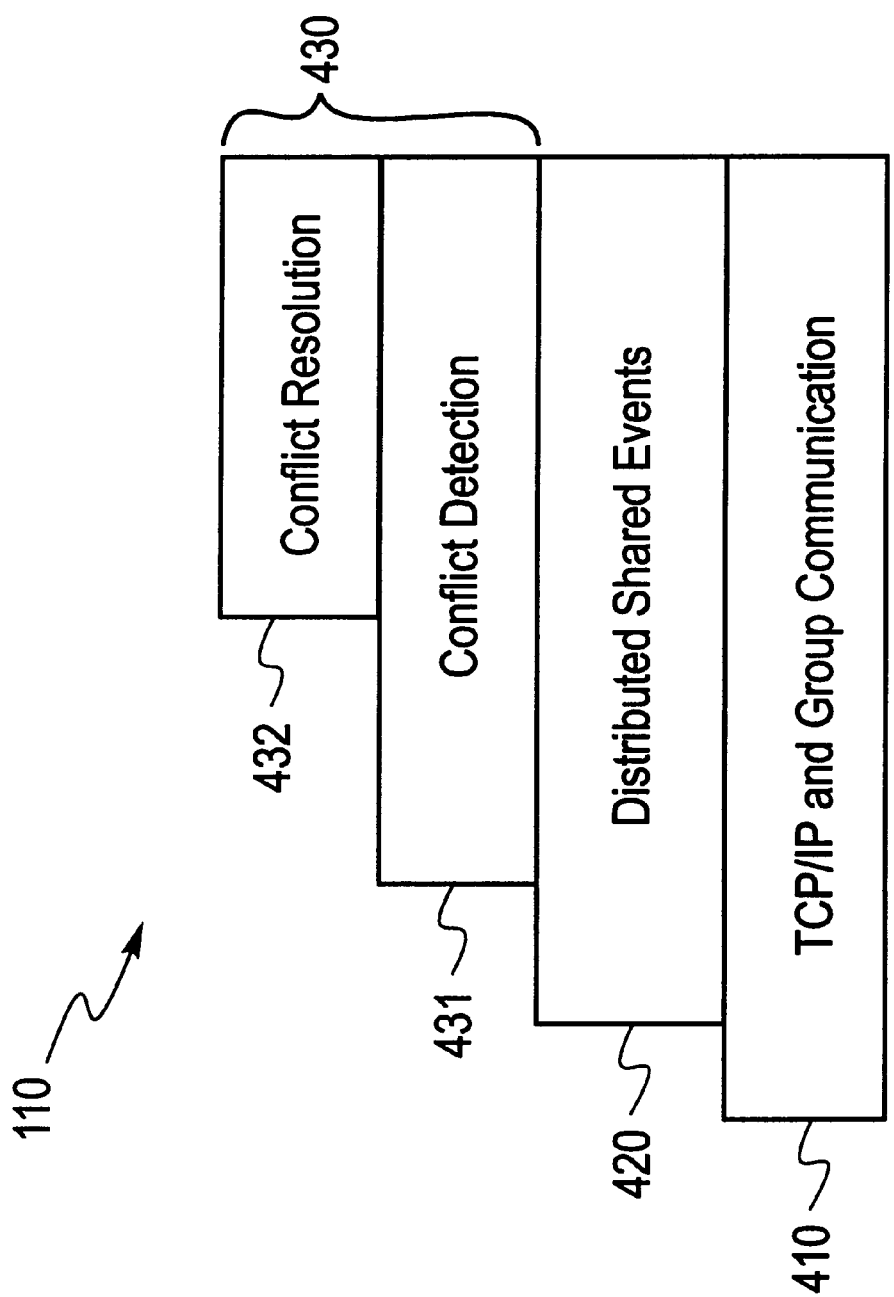
FIG. 4 depicts an example of the layers of the collaborative client middleware of FIG. 1.
Figure 5:
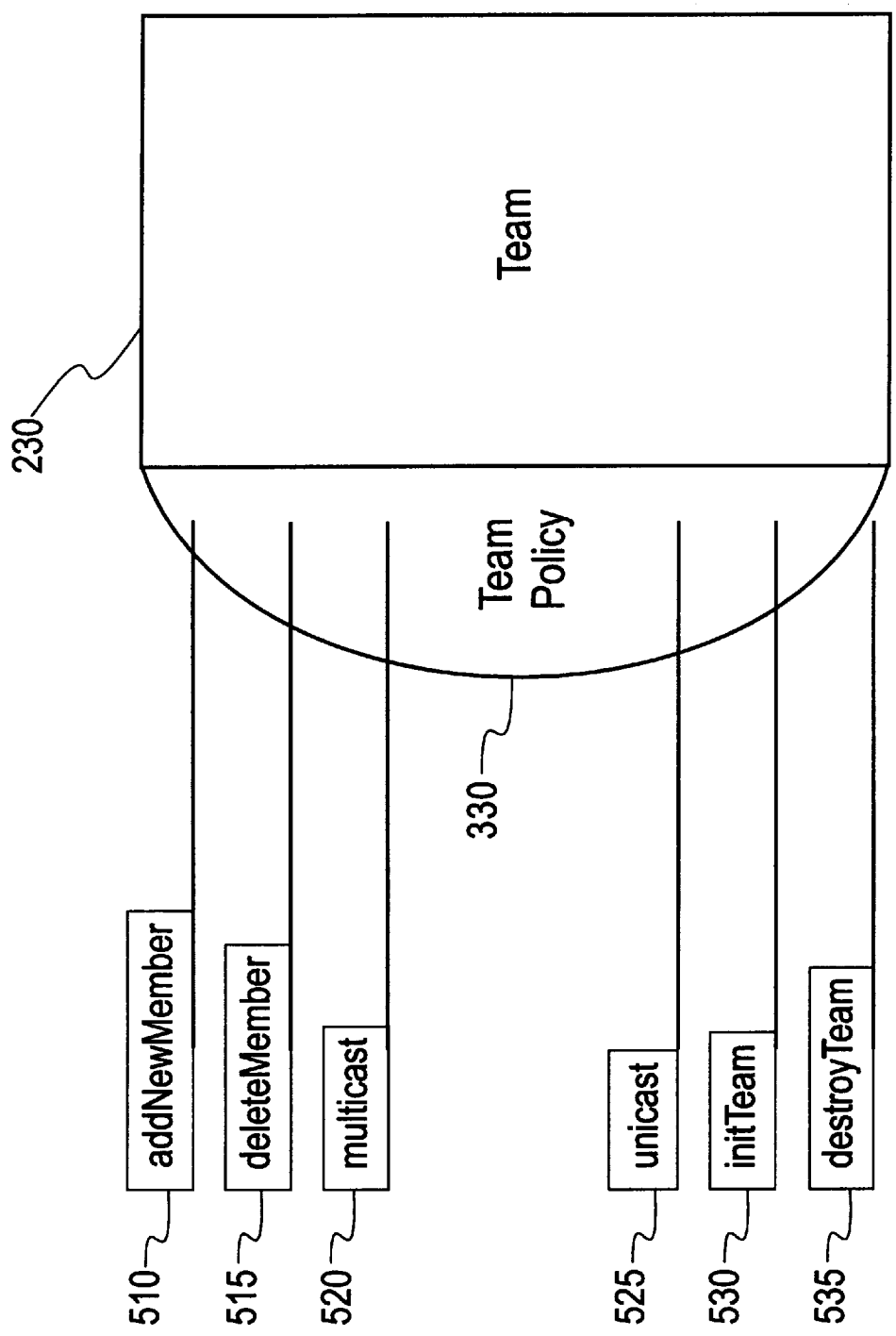
FIG. 5 depicts an example of the interface of a Team Policy of FIG. 2.

FIG. 5 depicts an example of the interface of the Team Policy 330. As depicted, a TeamPolicy object 330 defines the type of a team 230. A team can be instantiated either with an existing type or a new application-defined type. A certain behavior of a team 230 can be programmed by implementing the following functions of the TeamPolicy object. For example, a team can implement an authentication policy for its members using the addNewMember 510 function. Similarly, a required performance for event distribution can be achieved by implementing a suitable multicast 520 and unicast 525 protocol. By way of example only, the following methods can be included in one embodiment of the present invention:

1. addNewMember( ) 510: a function defining the behavior of a team when a new client joins the team.
2. deleteMember( ) 515: defines the policy of a team when a client leaves the team.
3. multicast( ) 520: defines how events are multicast to the members of a team.
4. unicast( ) 525: defines how a message can be sent to a specific member.
5. initTeam( ) 530: defines the initialization steps required when a new team is created.
6. destroyTeam( ) 535: defines a policy of a team when the team is destroyed FIG. 4 depicts an example of the collab client 110 having features of the present invention. As depicted, the client side middleware 102 layer includes several layers. In an Internet embodiment, the TCP/IP and Group communication protocol layer [1][4] is preferably used to implement a distributed shared events layer 420. The Distributed Shared Events (DSE) layer 420, provides support for sharing application specific events among application components residing in client machines 100, 170 distributed in a wide area network such as an intranet or the Internet. Finally, support for shared objects 190 and state consistency 430 is provided to the applications by the Distributed Shared Objects (DSO) layer 430. Unlike existing systems supporting distributed shared state, the DSO layer 430 decouples conflict detection 431 and conflict resolution 432 by providing two levels of support to application components 105. The conflict detection level 431 detects conflicts of updates to shared state (described in detail in FIGS. 13–16). At a first level of support, once the conflict is detected, the application components 105 are informed. An application may implement its own conflict resolution policy using this information. At a second level of support, the DSO layer 430 provides application components 105 with a unique conflict resolution policy (described in detail in FIG. 11) which is suitable for collaborative applications. A collaborative application 103 can be programmed using the DSE support 420 for shared events, the DSO 430 support for shared state, or both. Both the DSE layer (FIGS. 6, 7) and DSO layers (FIGS. 6, 8–16) will be discussed in more detail below. Those skilled in the art will appreciate that many of the features of the DSE and DSO (middleware) layers could be alternatively implemented in the application layer 103 within the spirit and scope of the present invention.

Application Components

FIG. 6 depicts a more detailed example of the Application Components 105 of FIG. 1. As depicted, a Component 105 is a distributable building block of an application 103. Each Component may be executed independently and communicates with other Components as necessary. A Component can be created using the DSE and DSO support provided by the system for sharing events and state, together with application-specific code. The specific behavior of a Component 105 is programmed with Event Reaction Units (ERU) 630 and shared object sets 680 (described in more detail later).

Applications developed using shared events can be programmed with ERUs. According to the present invention there are two main parts to the specification of an ERU: the condition (also called precondition or trigger), and the reaction. The reaction is the body of the ERU and is executed when the condition is true. When an application component 105 is initialized, it registers its ERUs 630 with the collab client 110. An example of a registration mechanism is a table where each record includes an ERU identifier and its preconditions. As asynchronous events arrive, the collab client 110 checks if any of the registered ERU's condition is 'true'. Once the condition is satisfied, the collab client 110 delivers 610 the event to the Component. The Component 105 then reacts to the event by executing the reaction of the corresponding ERU 630, which can be synchronous (as a function call) or asynchronous (as an independent thread).

The implementor of an ERU 630 can control its activation by associating a condition routine with that ERU. The role of such a routine is to define a scheduling policy for an ERU's reaction. A condition is defined as the satisfaction of requirements on the arrival of events 610. Therefore, associated with each ERU is a conditional function which, given a set of reference events and a set of received events, determines whether some condition for executing the body of the ERU has been met. For example, in a collaborative foil flipper supporting annotation, the ERU 630 responsible for displaying annotations on a foil does not get triggered until both an annotation event and a foil flip event (to flip to the foil which needs to be annotated) are received at a client. This can be achieved using a conventional "AND" logic condition which returns true if all reference events required by the ERU are received.

The body (reaction) of the ERU may perform any computation or task and may optionally produce outgoing events 620. Application components 105 react to incoming events 610 according to their programmed behavior and generate events 620 which may similarly stimulate other components 105.

Here, the events (610, 620) are the units of communication in the DSE layer 420, and are first-class objects. An Event preferably has a name, a type, data, and a source. Event reactions within an application component 105 are broadcast to "interested" ERUs 630. An interested ERU is one which reacts to the given event. Outgoing Events 620 (communicated outside an application component) are broadcast to interested components. An "interested" component in is one which has at least one ERU interested in the given event.

Sharing Events

Figure 7:
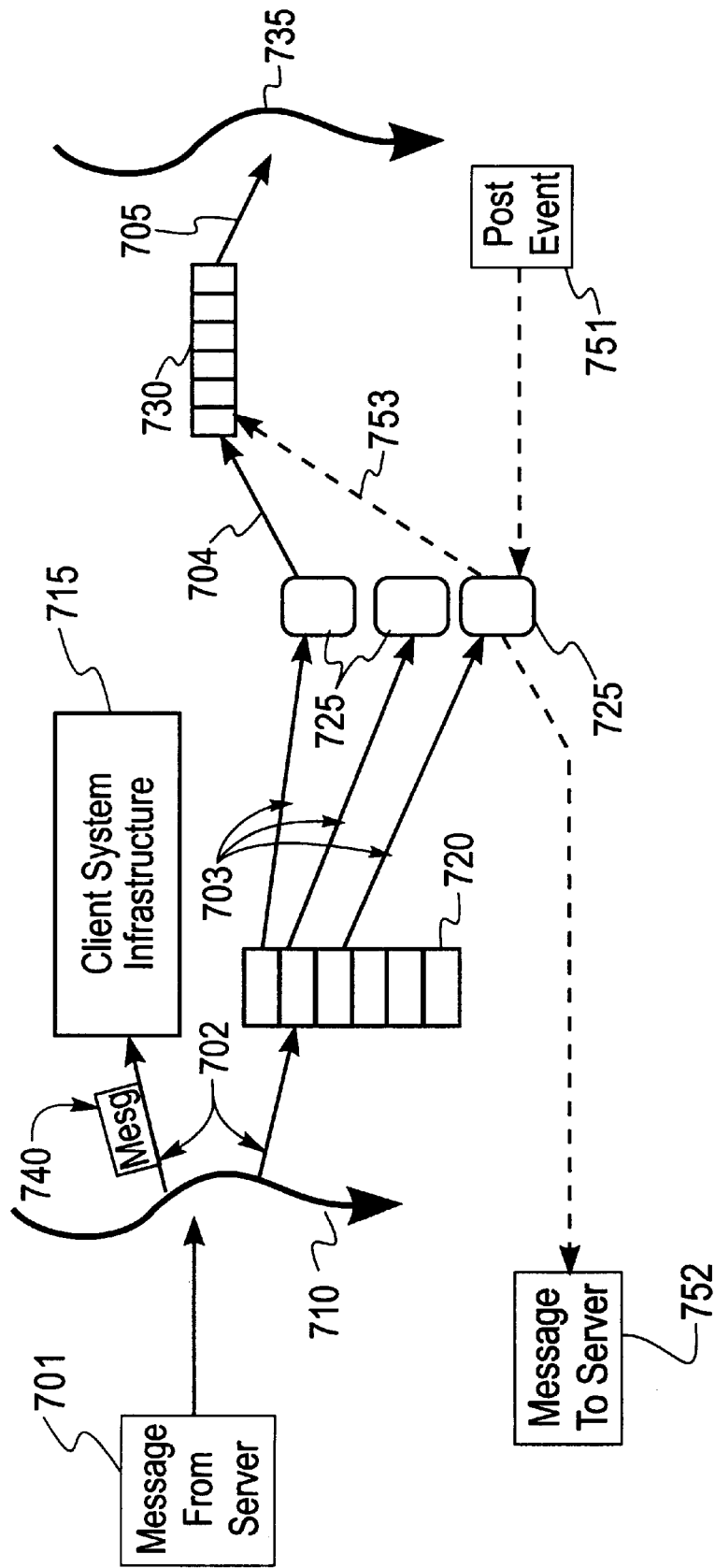
FIG. 7 depicts an example of a Distributed Shared Events infrastructure at the client side.

FIG. 7 depicts an example of several data structures and a logic flow for sharing events. As depicted, when a client 100, 170 joins a named team 230, a handler object (TeamDescriptor object) 725 is instantiated at the client. The Team Descriptor 725 could be any conventional handler object which provides an interface to a client, that the client uses to communicate with the team 230. All the client objects in a team can post events 751 to the team members (possibly via the server 120). Each team 230 preferably has a policy 330 on how events are distributed to its members. Depending on the event distribution policy required by a team, the TeamDescriptor object 725 implements a policy in the client 100, 170. This policy is responsible for ordering of events posted 751 in a team (ranging from ordering everything through the server 752 to dispatching locally generated events 753 immediately), and dispatching of received events. For example, a simple event distribution policy dispatches received events to pre-specified objects. An enhanced version dispatches events using the target field of the java.awt.Event [3] object, and does automatic translation of the target to and from a machine-independent reference. This allows single user applications to be made collaborative by establishing equivalence between certain user-interface (UI) objects and then broadcasting user events to everyone. As described below, a complex policy can also be used to provide efficient support for shared state for collaborative applications.

The server team object 230, after receiving an event, can multicast it to all the clients (100, 170) in the team, or can unicast 525 the event to a particular client 520 using the underlying network communication protocol. A client preferably can query the list of available teams 230 in the server 120, and can also query the members of each team. A client joins a team in three roles (1) sender, (2) receiver or (3) both.

Referring again to FIG. 7, the example DSE mechanism includes a dedicated thread called the Client Communication Thread (CCThread) 710 in the client waiting for messages. Messages are preferably used for communication between the collab client 110 and the collaborative activities 150. In step 701, a message arrives from the server 120. A message may either contain an event posted to a team or it may carry information required by a collab client 110 (called infrastructure messages). On receiving the message, the thread 710, checks if the message is for the collab client infrastructure 715 or a TeamDescriptor object 725, in step 702. Infrastructure messages 740 are dispatched to the infrastructure 715. If the message is targeted for a team descriptor 725, it looks up the descriptor for which it is intended using a TeamDescriptor Lookup Table 720. In step 703, the message is then dispatched to the appropriate TeamDescriptor 725. If using a Simple event distribution type, this message potentially contains an event 620 posted to a team by an application component 105. In this case, the event is placed in a Shared Event Queue 730, in step 704. A Shared Event Thread 735 is then responsible for picking up events from the queue and dispatching them to the registered ERUs 630, in step 705. The dashed arrows demonstrate how a TeamDescriptor could implement a (752) "post event" interface (used by a client to post an event to a team) for an application. On receiving the post event 751, the TeamDescriptor 725 sends it (in step 752) to the server as well as directly puts it (in step 753) in the local shared event queue 730, to avoid the round-trip delay from the server.

Shared Objects

Referring again to FIG. 6, a set abstraction is preferably used to represent a collection of related shared objects 680. Objects 650 in a shared set 680 can have pointers to other objects in the same set, which can be cyclic (see FIG. 8). Applications in a collaboration can dynamically join or leave a set. All the objects 650 in a set 680 are fully replicated at all the applications 103 that have joined that set of objects. This asynchronous model allows the specification of atomic operations on the shared state using update events. The three main operations on an object set 680 are:

1. addObject(Object o): Adds o to the set where o can have pointers to the objects already in the set.
2. deleteObject(Object o): Delete object o from the set.
3. updateEvent(Event e): This method is used to issue an update to the objects in the set. The update event e encapsulates the actual update, and can atomically read and write a subset of those objects 650. The handleEvent( ) method of e, when executed, does the actual update.

Figure 8:
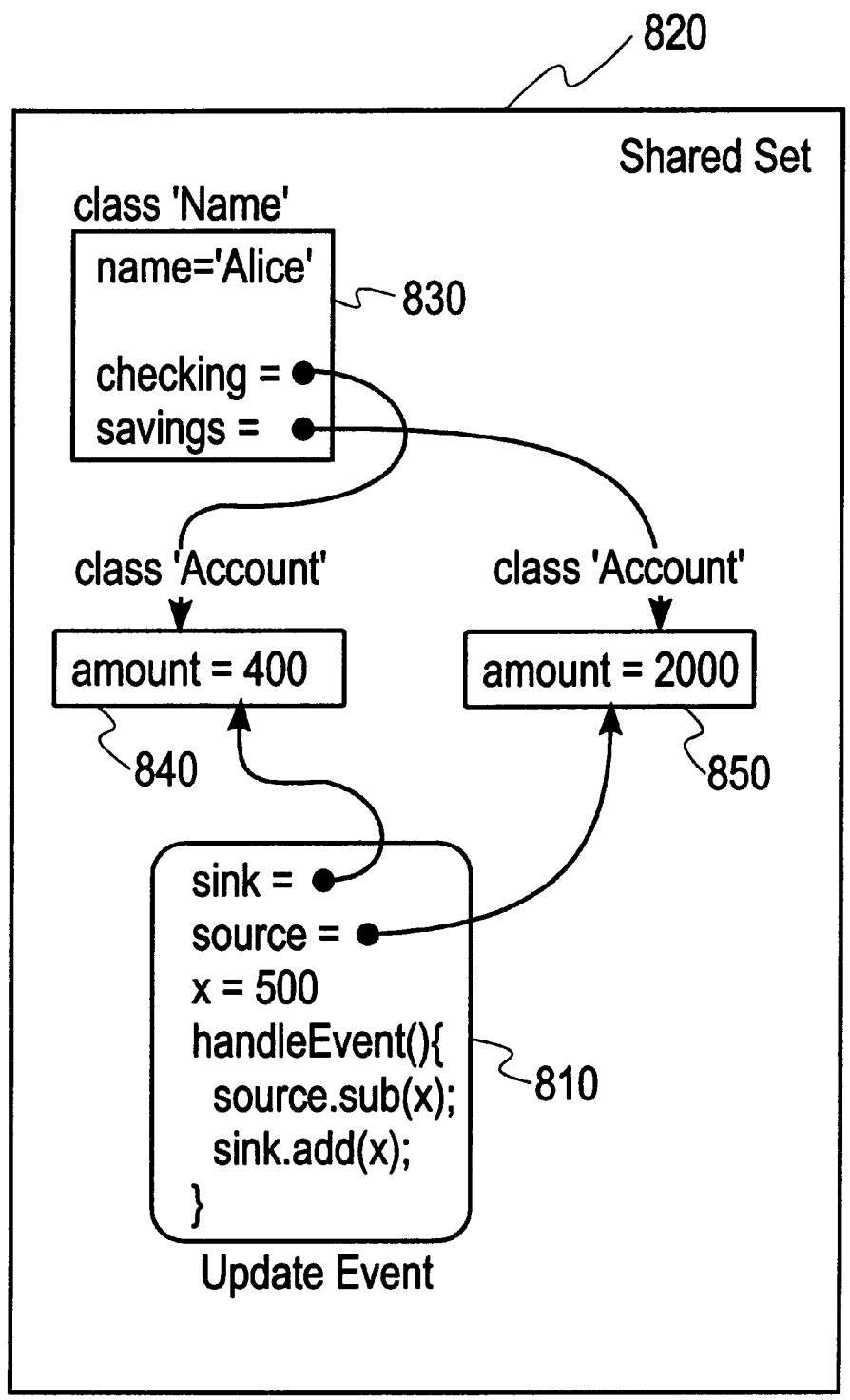
FIG. 8 depicts an example of a Distributed Shared Object set.

FIG. 8 depicts an example of an event object 810 and a shared set 820 containing three objects: an object 830 of type Name; and two objects of type Account 840, 850. The event object 810 includes a handleEvent method to update the state of the two objects 840 and 850 in the shared object set 820 (it subtracts $500 from one account object 850 and adds the amount to the other account object 840).

The addObject method: adds an object o to a local set replica 680; sends a message with the new object state to other processes; and then returns. In contrast, the other two operations are asynchronous, i.e., they are executed locally and then remotely at some time in the future.

Marshaling

To propagate the state of the newly added objects or the update events to other processes in the collaboration, the state needs to be marshaled. Most systems assume that an object knows how to marshal itself, and therefore expect it to implement a simple marshal method to which they pass an output stream as a parameter [3]. However, for complex applications, the marshaling of an object is very context dependent. For example, let 'A' be an event object being added to a shared object set, which has a pointer to 'B', (an object already in the set). The object 'A' needs to be marshaled, as its state has to be sent to the other replicas. But when marshaling object A, object B is not marshaled, and a machine independent handle is substituted for it. However, when a new client joins the set, the state of both A and B have to be marshaled, so that the newcomer can be initialized. More complex scenarios arise when the system needs to provide support for object cloning and state consistency. However, the basic inference is that the system needs to provide a context for the marshaling, which the present invention does by using a MarshalHelper object.

An example of a Marshalable interface, implemented by the objects, is given below.

```
public interface Marshable {
/* out: output stream to write the state */
public void marshal(DataOutput out, MarshalHelper mh);
/* in: input stream to read the state */
public void unmarshal(DataInput in, MarshalHelper mh);
}
```

For example, the class Name 830 (from FIG. 8) could implement Marshalable as follows:

```
public void marshal(DataOutput out, MarshalHelper mh)
{
  out.writeStream(name);
  mh.genericMarshal(out, checking);
  mh.genericMarshal(out, savings);
}
public void unmarshal(DataInput in, MarshalHelper mh)
{
  name=in.readStram();
  checking=(Account) mh.genericUnmarshal(in);
  savings=(Account) mh.genericUnmarshal(in);
}
```

Thus, a call to the MarshalHelper is preferably interposed whenever marshaling crosses object boundaries in an object graph. This allows the MarshalHelper to do something else instead of, or before calling, the marshal method of an object.

As the Marshalable implementation is completely oblivious to the context of the object, a class can be used both as a shared object and as an event.

Figure 9:
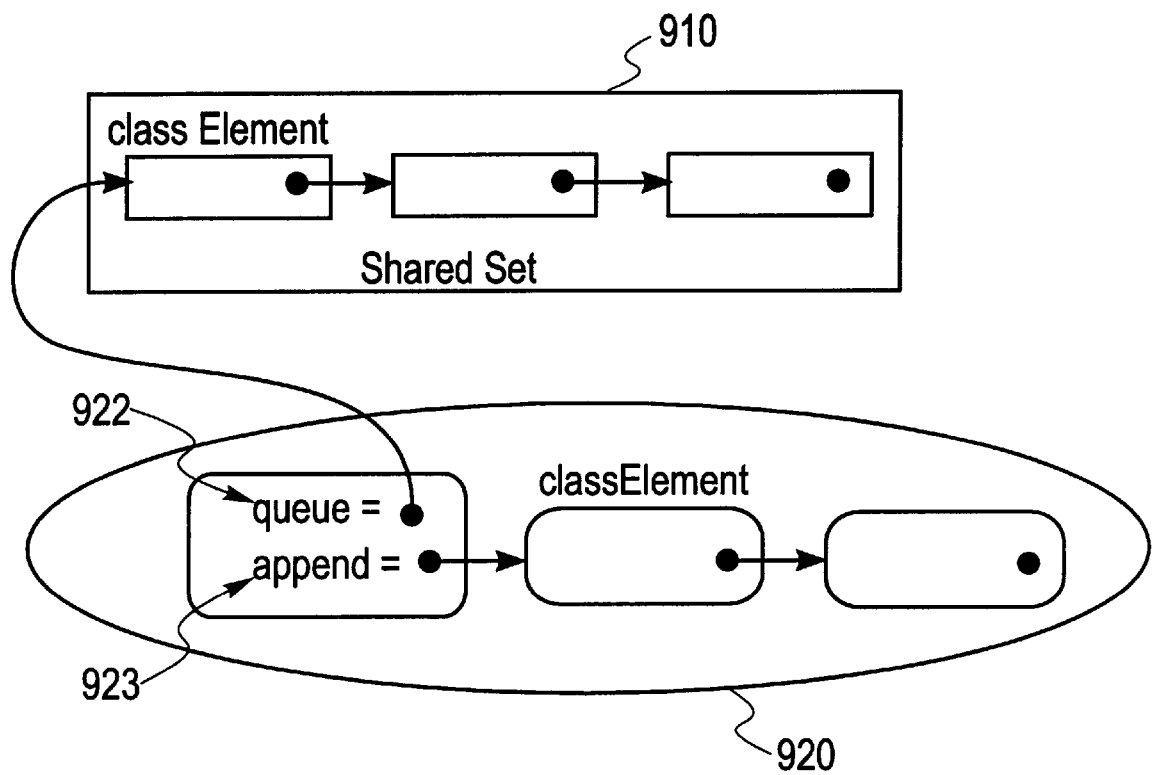
FIG. 9 depicts an example of marshaling object state.

FIG. 9 depicts an example implementation of a shared conventional linked list 910 using shared sets. An update event can be used to append another list 920 to the end of this shared list 910. As discussed, when marshaling the queue field 922, the MarshalHelper substitutes a machine independent handle, while it marshals the complete state of the append field 923. This flexibility cannot be achieved with a marshaling interface like JAVA object Externalization [3], where the object being marshaled needs to keep some information about its context and use it in the Marshalable implementation. This interface is also especially useful when doing partial checkpointing.

The common case of an update event with just one method invocation can be made less cumbersome for the application writer by providing automatically generated proxies which package the method invocation into an event. Note that this is not the same as invocation proxies in JAVA, RMI or CORBA.

State Consistency

Potential inconsistencies in the replicas can arise due to different ordering of the events at different processes. Most systems take one of two extreme approaches when dealing with consistency of replicated state: (1) a fully optimistic approach with rollbacks and reexecution; and (2) a pessimistic approach utilizing locking. The optimistic approach frees the application programmer from the burden of consistency maintenance, but the effect of jitters in the user interface due to automatic rollback could be a problem. The pessimistic approach has the problem of not allowing enough freedom of interaction. It has been observed that strict locking is usually not necessary for collaborative applications because of implicit social protocols employed by collaborating users. The present invention uses an intermediate approach which uses optimistic execution along with a combination of three mechanisms which flexibly expose the application writer to more of the distributed nature of the application.

This section discusses the three level approach to state consistency. First, global locks are provided to guarantee correct ordering of events at all clients. When a client updates the state of a shared object: it first acquires a global lock; issues the update events; and finally, releases the lock. Since the lock release is ordered after the events issued while the lock was held, updates to a shared set are completely ordered. Second, for applications in which locking is not always desirable, the system also provides conflict detection. Third, a cloning and re-initialization method can be used to construct an application specific conflict resolution policy.

Conflict Detection

The conflict detection algorithm depends on the architecture of the system. By way of example only, the present invention assumes an architecture where clients (100, 170) are logically arranged in a star configuration with a server 120 in the center. All events flow through the server, and the order in which the server receives the events is the 'correct' order. Events originating at a client 100 are immediately executed locally and also sent to the server 120. This optimistic execution can result in inconsistency. The server 120 distributes the events to all the clients (100, 170), including the source, using conventional FIFO communication channels.

Let $X=O^1, O^2, \ldots, O^m$ be a current set of shared objects 680 (FIG. 6). An event e issued on this set has a read-set e.R $\subseteq X$ and a write-set e.W$\subseteq X$. Each client process P maintains an "unstable" queue of events. These are the events which originated at P and have been executed at a local client 100, but have not yet been reflected back by the server 120. Let a remotely originating event e" be received at P. The possible reasons for conflict are:

1. write→write: e" writes an object which is also written by an event in the unstable queue.
2. read→write: e" reads an object which is written by an event in the unstable queue.
3. write→read: e" writes an object which is read by an event in the unstable queue.

Figure 13:
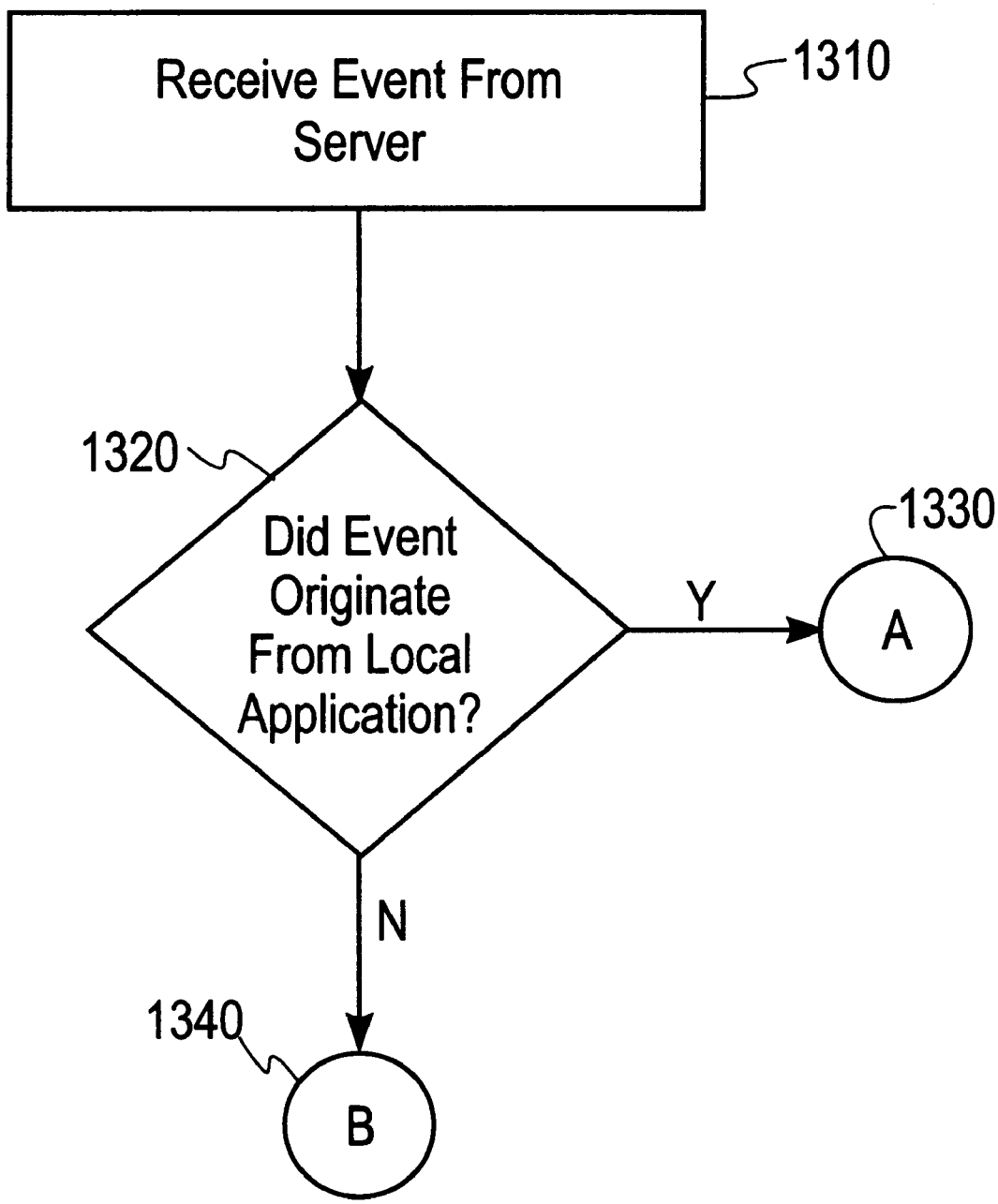
FIG. 13 depicts an example of logic flow for conflict detection.
Figure 14:
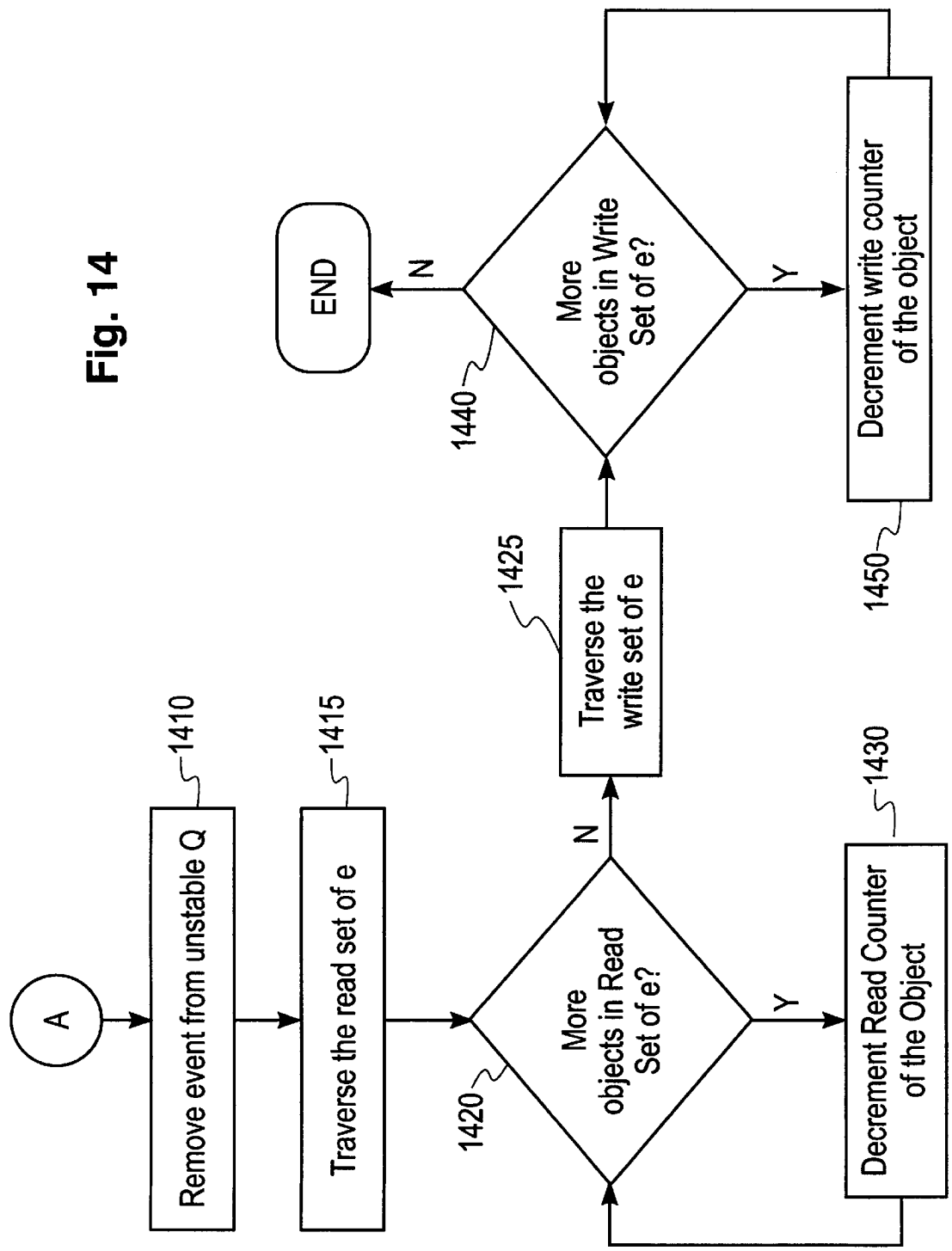
FIG. 14 depicts an example of logic flow for the "A" branch of the flow chart of FIG. 13.
Figure 15:
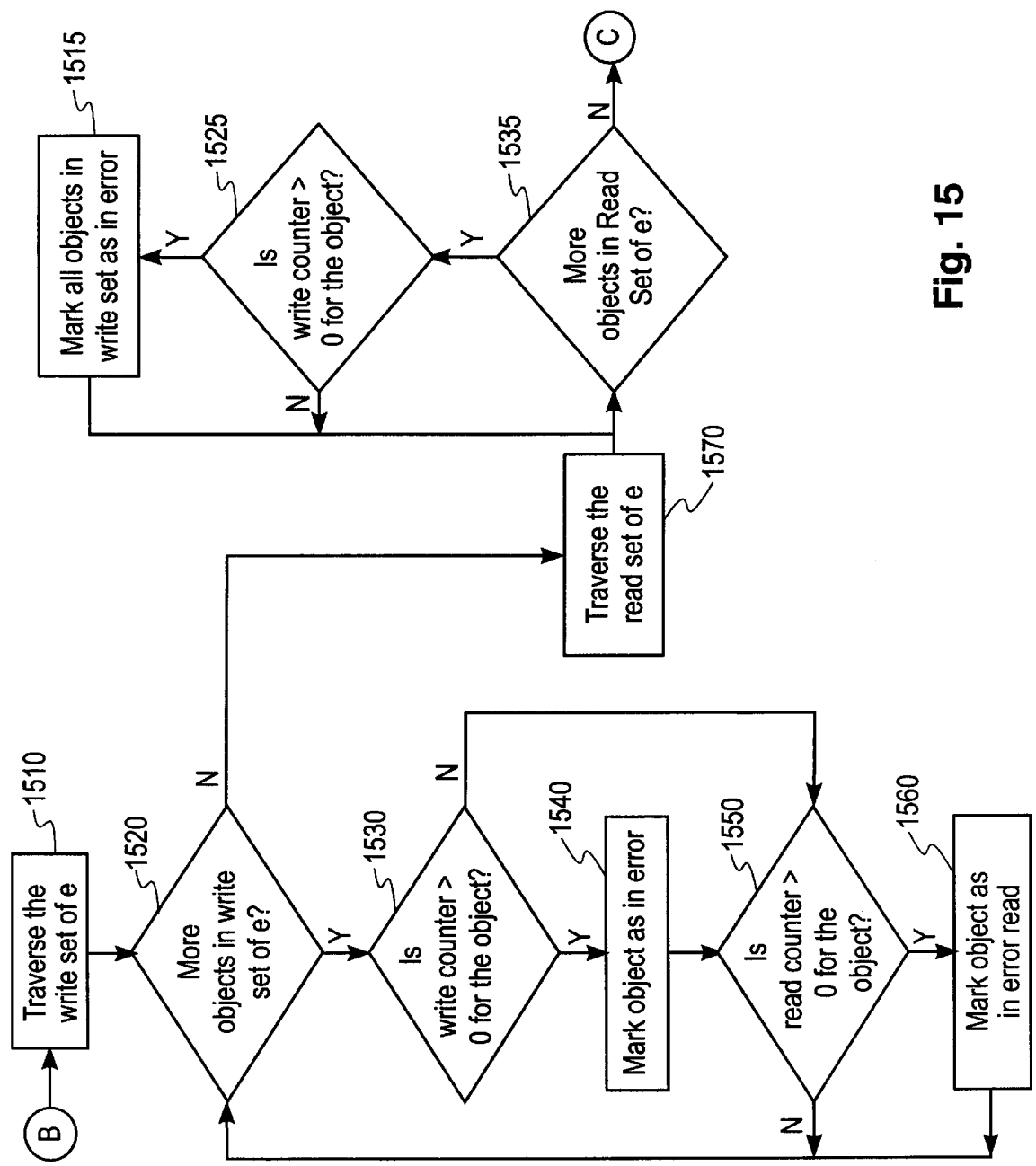
FIG. 15 depicts an example of logic flow for the "B" branch of the flow chart of FIG. 13.
Figure 16:
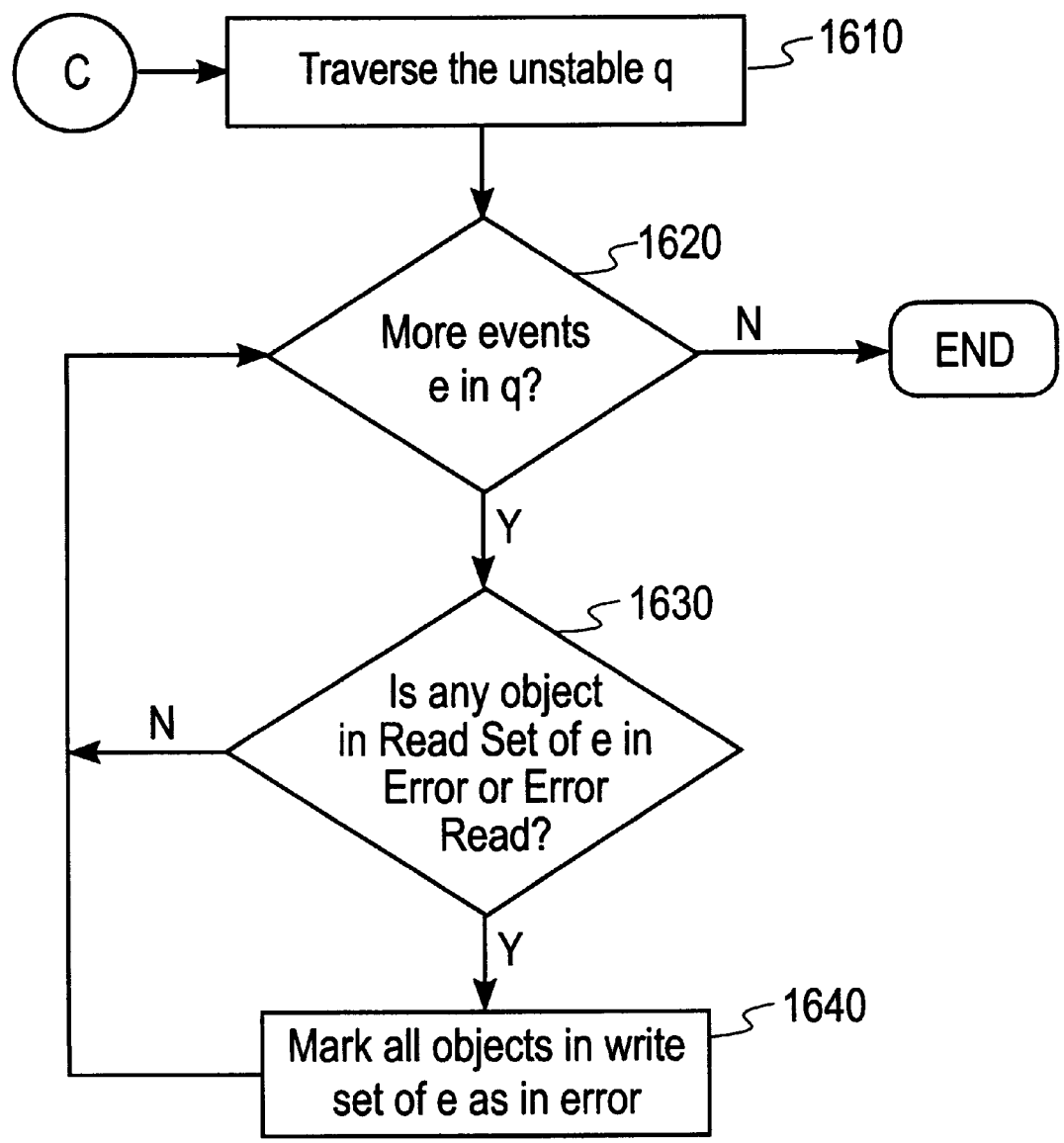
FIG. 16 depicts an example of logic flow for the "C" branch of the flow chart of FIG. 15.

FIGS. 13–16 depict examples of a logic flow corresponding to the following pseudo-code process, which describes a simplified method for maintaining a set of objects 680 whose state is in error at a client process P. These objects are in the error set. For each object o, the fields o.numOfR and o.numOfW give a count of the number of times o is read and written respectively by events in the unstable queue. A localEventReceived is a method called when an event is generated locally and localEventReflected is called when such an event comes back from the server (FIG. 14). When a remote event is received, the method uses the read and write set information of that event and the events in the unstable queue (which should have been ordered later), to detect errors (FIGS. 15, 16).

```
remoteEventReceived(e) {
    S^err=S^read=∅
    ∀o∈e.W
        if (o.numOfW>0) // write→write
            S^err=S^err+o // objects in error
        if (o.numOfR>0) // write→read
            //events reading this set are conflicting
            S^read=S^read+o
    ∀o∈e.R
        if (o.numOfW>0) or (o.inError)
            // writes could depend on an incorrect read
            S^err=S^err+e.W // read→write,error→read
    while (unstable.notEmpty)
        e'=unstable.next()
        q.add(e')
        if (e'.R∩S^err≠∅) or (e'.R∩S_{read}≠∅)
            S^err=S^err+e'.W
    unstable=q
    ∀o∈S^err, o.inError=true
    error=error+S^err
}
localEventReceived(e) {
    unstable.add(e)
    if (error∩e.R≠∅)
        error=error+e.W
    ∀o∈e.W, o.inError=true
    ∀o∈e.R, o.numOfR++
    ∀o∈e.W, o.numOfW++
}
localEventReflected(e) {
    unstable.next() // remove from queue
    ∀o∈e.R, o.numOfR--
    ∀o∈e.W, o.numOfW--
}
```

As depicted in FIG. 13, when an event is received at a client (100, 170) from the server 120, in step 1310 in step 1320 the collab client 110 checks, if the event was generated by a local application component 105. If yes, in step 1330, (as depicted in FIG. 14), the collab client 110 removes the event from the "unstable queue" 1410. Then, for every object in the read-set of the received event, it decrements a read counter of the object, in steps 1415, 1420, and 1430. Similarly, for each object in the write set of the event, it decrements the write counter of the object, in steps 1425, 1440, and 1450.

Referring again to FIG. 13, if in step 1320 it is determined the event was generated by a remote application component the process proceeds to step 1340, (as depicted in FIG. 15). Referring now to FIG. 15, the collab client 110 checks if the write counter of any object in the write-set of the event is positive, in steps 1510, 1520, and 1530. If found positive, it marks the object as in error, in step 1540. Otherwise, it checks if the read-counter of the object is positive, in step 1550.

If positive, it marks the object as in error, in step 1560. Similarly, the collab client 110 checks if any object in the read-set of the event has a positive write counter, in steps 1570, 1535, and 1525. If yes, it marks all the objects in the write set as in error, in step 1515. Finally as depicted in FIG. 16, for each event in the unstable queue it checks if any object in the read-set of the event is in error, in steps 1610, 1620, and 1630. If yes, it marks all the objects in the write-set of the event as in error.

Finally, to help the application fix these errors automatically or with the help of user interaction, a cloning and re-initialization mechanism is provided.

Cloning and Re-initialization

By way of overview, the cloning mechanism of the present invention allows an application component 105 to make a copy of a subset of objects 650 in a shared set 680 (FIG. 6). Pointers from inside the original subset to objects outside are preserved in the cloned subset. Pointers between objects inside the original subset are mapped into the cloned subset.

Figure 10:
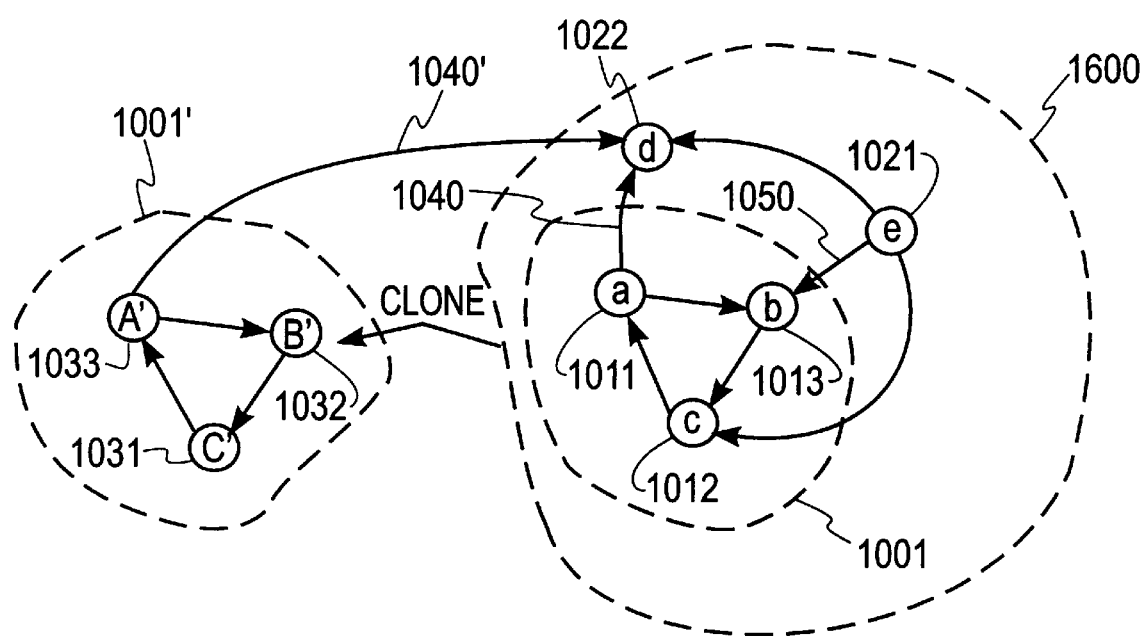
FIG. 10 depicts an example of a cloning operation for a shared object set.

FIG. 10 shows an example of the effect of cloning a subset 1001 of objects: a 1011; b 1013; and c 1012, in a shared set 1000. The created clone of the subset 1001' includes objects: a' 1033; b' 1032; and c' 1031. As depicted, the clone object a' 1033 preserves the pointer (1040, 1040') to an outside object d 1022. The pointer 1050 from the object e 1021 to the original object b 1013 is not modified. The cloned subset 1001' can be added to the original shared set of objects (as soon an object or a set of objects is added in a shared set, the added objects become shared). This provides a mechanism to export incorrect state to other clients, so that different versions of the same object can be compared. It can then be used to re-initialize the state of the originals from the clone.

Figure 11:
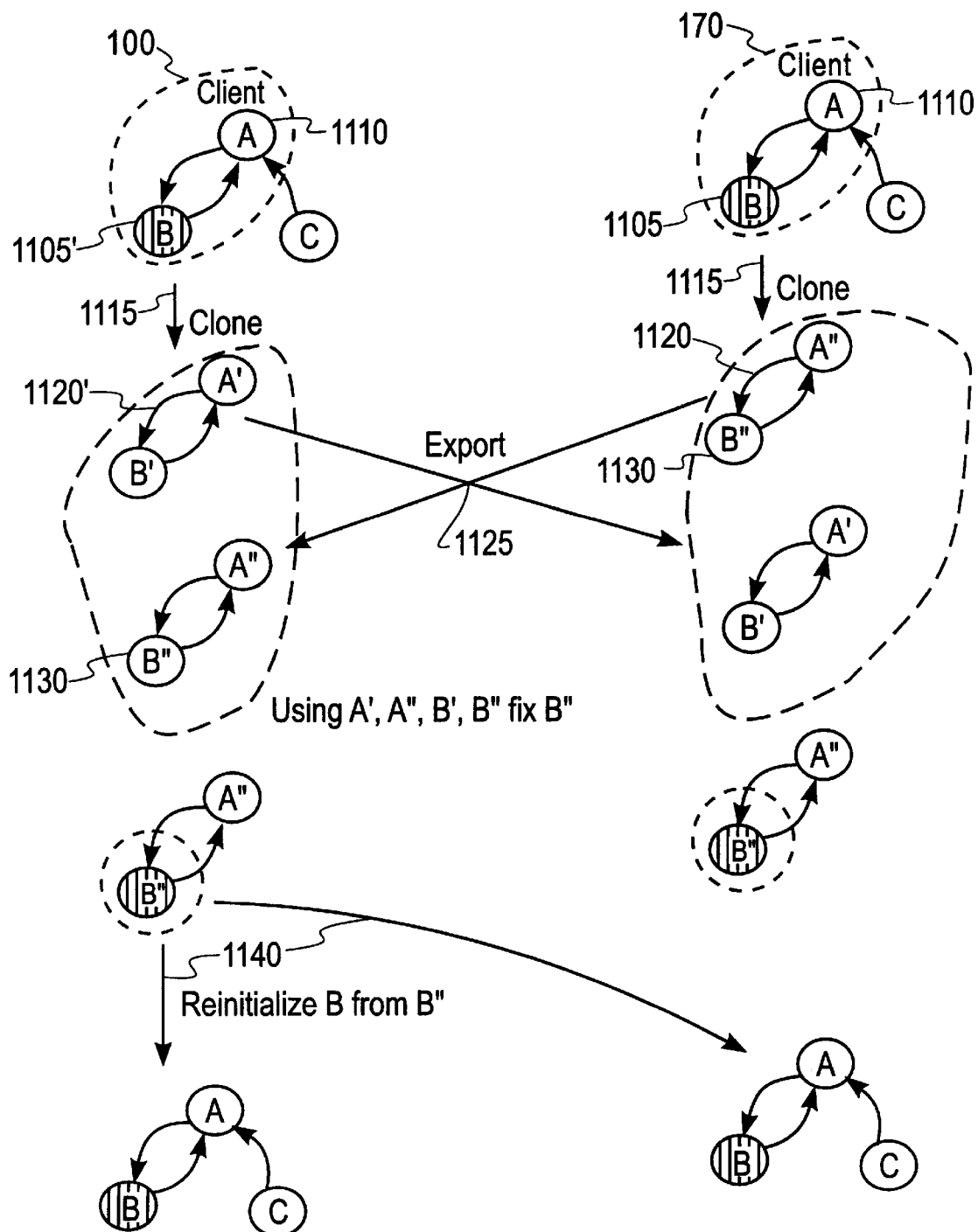
FIG. 11 depicts an example of cloning and re-initialization of a shared object set.

FIG. 11 depicts an example of how the cloning and re-initialization mechanisms can be used to correct diverging state. The collab client 110 detects (using the conflict detection algorithm described above in FIGS. 13–16) that the replicas of an object B (1105, 1105') of an application component 105 at a local client 100 and remote client 170 are different and informs the application component 105. The components clone (in step 1115) both A 1110 and B, (since meaningfully interpreting B alone is not possible). These clones (1120, 1120') are exported (in step 1125) to each other by adding them to the corresponding set of shared objects. Now that the clients have local copies of the differing states, they can compare and select one of these to represent the correct state. In the example, they select object B". In step 1140, the object B" 1130 is then used to re-initialize the originals by client 100.

This cloning of some objects and subsequent re-initialization of a subset of those objects is also made possible by the present invention's flexible marshaling interface. When re-initializing a subset of the objects in the clone relationship, the subset can be marshaled in the context of the clone, but unmarshaled in the context of the original. The clone relation can also be nested, i.e., clones can be made of clones, and then re-initialization can be done by following the path back to the parent.

The re-initialization can be done using a special type of update event, called a re-initialization event. This event does not read any objects, but re-initializes the state of all the objects in its write set. The following pseudo-code logic depicts an example of how this event can be processed by the collab client 110. The processing for a local re-initialization event reflected back from the server remains the same.

remoteReinitEventReceived(e) {
    $\forall_o \in e.W$
    o.inError=false
    error=error−o
    remoteEventReceived(e)
}
localReinitEventReceived(e) {
    $\forall_o \in e.W$
    o.inError=false
    error=error−o
    localEventReceived(e)
}

Event Batching

In a preferred programming model, shared objects 650 are modified only through update events issued using the updateEvent method. The system executes these events locally as well as multicasts them to all the processes in the set, which then execute the events to bring about the same state change. To get good response time for the issuer's actions, these events should be fine-grained. For example, in a text editor, every keystroke may have to be packaged as an event so that an issuer (say Alice) sees the result of her actions immediately. But in most cases it is not necessary for other users to see the keystroke generated by Alice immediately. In fact, Alice may not want them to see her modifications until they are in a presentable form. The simplest solution to this problem is to collect several events and package them together in a message before doing the multicast. However the space overhead of such a solution is going to be high for the following reasons.

1. If Alice is in a very experimental mode, there might be a lot of undoing of previous actions which could allow for elimination or compression of certain events. However, as the system does not know this, it cannot do so.
2. Each event is packaged with some system information before being sent to other processes. When events are simply batched, a lot of overlapping system information cannot be eliminated.

The proposed solution, called Late Event Modification (LEM) enhances the event interface to allow applications to modify the event objects after posting them to the set. However, these modifications can only be made before the event is marshaled and sent out to other processes. For the purposes of explaining this application specific batching scheme, the following assumption is made about the client system implementation: There is a SharedEvent Thread 735 which maintains an event queue 730 for events waiting to be executed, and executes their handleEvent (FIG. 8) methods in order.

LEM Architecture

Figure 12:
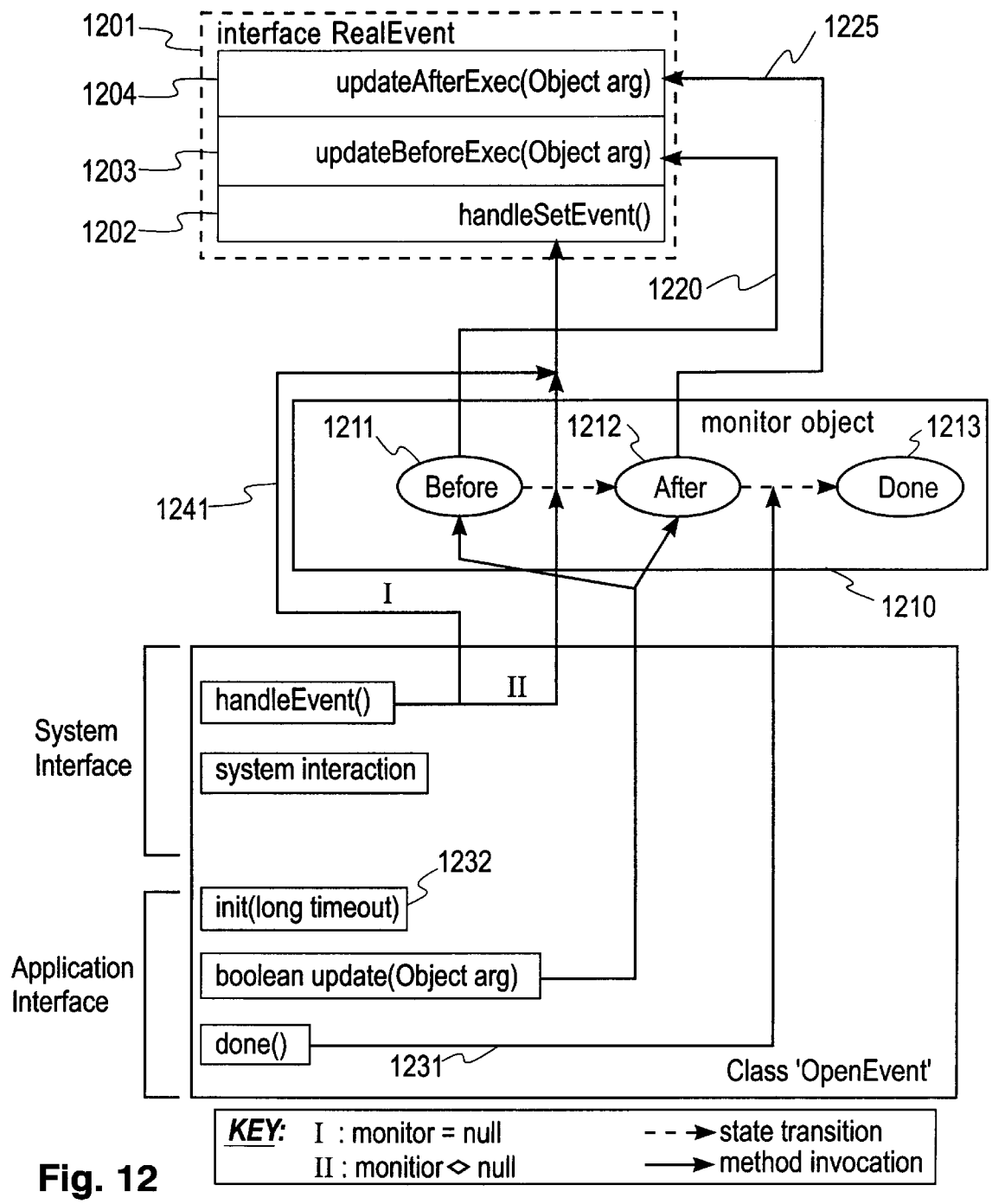
FIG. 12 depicts an example structure and interface for the OpenEvent class used in Late Event Modification (LEM)

To support LEM, an abstract event class is provided called OpenEvent, which is extended (or sub-classed) by the application 103 to implement the required event functionality. FIG. 12 depicts an example of the OpenEvent class with the dashed box 1201 showing the abstract methods implemented by the application 103, and a monitor object 1210 which maintains a current state of an event. The abstract methods (the RealEvent interface 1201) are:

handleSetEvent( ) 1202: The actual event handler which is executed by the SharedEvent Thread 735 when the event reaches the front of the event queue 730.

updateBeforeExec(Object arg) 1230: This handles any updates to the event Object before 'handleSetEvent' 1202 is executed. Typically, this will just update the state of the event Object.

updateAfterExec(Object arg) 1204: This handles any updates after the handleSetEvent 1202 has been executed. This has to update the state of the event and the relevant shared objects.

As discussed, the monitor object 1210 maintains the current state of the event. An event generated at a local client 100 goes through three states after an application component 105 posts it to a shared set 680 and before it is marshaled and sent out to the server 120.

1. BEFORE 1211: The handleSetEvent 1202 method has not yet been executed by the SharedEvent Thread 735.
2. AFTER 1212: The handleSetEvent 1202 method has been executed.
3. DONE 1213: The event has been marshaled. No more updates to the event are permitted.

These are preferably concrete event classes. To use them, the application component 105 creates one of these event objects and issues it using the normal updateEvent method. It can then use the update method implemented by the OpenEvent class to modify the event object. This results in a call 1220 to updateBeforeExec 1203 if the event state is BEFORE 1211 or a call 1225 to update AfterExec 1204 if the state is AFTER 1212. If the state is DONE 1213, neither of these two event classes is called and a value of false is returned.

The OpenEvent class provides two mechanisms to control the transition to the DONE 1213 state (1) explicit, by invoking the done method 1231, and (2) implicit, by using a time-out 1232 value. The time-out value specifies the maximum number of milliseconds after the execution of the handleSetEvent 1202 that the event can stay in the AFTER 1212 state. Note, that this does not prevent the application from explicitly calling the done method 1231. Also note that the done method 1231 can be called explicitly by the application thread or can be used inside the RealEvent 1201 methods. For example, consider a text editor where every keystroke has to be echoed immediately. A keystroke will result in posting of a new event or updating the previous one. Suppose we want a transition to the DONE 1213 state whenever the user presses the 'enter' key. This could easily be coded by making the updateBeforeExec 1203 and updateAfterExec 1204 methods check if arg=enter and then calling the done method 1231.

When this event is unmarshaled on a remote process, the monitor object 1210 is not created and the handleSetEvent 1202 is directly called 1241 from handleEvent. In fact, the abstract OpenEvent class has no state that needs to be marshaled.

Applications

This section discusses examples of two applications 103 which can be implemented using the system presented in this invention to demonstrate the utility of the mechanisms. An auctioning application implements an "open cry" auction and is an example of an asymmetric collaborative application. The other application is a (symmetric) collaborative drawing tool and is a modification of the DrawTest example applet provided with the JAVA Development Kit [3].

Auctioning

The auctioning application has 2 types of application components 105: (1) an auctioneer; and (2) bidders. The auctioneer and the bidders share the following state using the shared objects 650.

The item being auctioned.

The state of the item, i.e., is it sold or not sold and what is the highest bid on it and by whom.

The auctioneer is the only component 105 allowed to update this state.

In addition, there are 2 event sharing teams 230.

Bidding: The bidders are the senders and the auctioneer is the receiver. This is used to send bids to the auctioneer.

Notification: This has the auctioneer as the sender and the bidders as the receivers. This is used to notify the bidders if their bid was too low or late.

This application demonstrates the natural way in which event sharing (FIG. 7) and state sharing (FIG. 10) can be combined. Note that the bidding and notification teams 230 could have been implemented with shared object 650, by having a shared bid object and notification object between the auctioneer and every bidder.

Drawing Board

This application allows the users to share a drawing board on which they can draw and edit lines and curves. The lines and curves are drawn by pressing down on the left-mouse button, dragging it to the end point (or along a curve), and releasing the button. A shared object 650 is maintained for each line or curve, where the line is represented as two points and the curve as a list of points. The editing operations permitted on objects are translation, and changing the end-points (only for lines).

The application uses the conflict detection support (FIGS. 13, 14, 15, 16) provided by this invention to detect concurrent updates on the same object 650. It then allows the user to clone and export the complete set of objects to others (FIGS. 10–11). After deciding on the correct state, re-initialization of the complete set is done.

In addition, it uses Late Event Modification (FIG. 12) to give the user feedback while drawing or translating a line or curve. Consider the case of Alice drawing a line. The initial mouse press fixes the initial point of the line and adds the line object to the set. Though the final point is not fixed till Alice releases the button, she wants to see the current position of the line while dragging the mouse. However, others do not need to see each of these mouse drag events. LEM allows us to solve this problem by posting an updateEvent 810 with the current final point and then continuously modifying the final point value in the event object as Alice drags the mouse. The done method 1231 is called on the event when the mouse button is released.

This application can be enhanced in two ways. First, instead of cloning the complete set, it could clone the object 650 in error and the objects in its physical neighborhood. After users fix the errors, re-initialization is done for the single object in error.

Thus, while we have described our preferred embodiments of our invention, with alternatives, it will be understood that those skilled in the art, both now and in the future, may implement various equivalents, improvements and enhancements which fall within the scope of the claims which follow. These claims should be construed to maintain the proper protection for the invention first disclosed.

Bibliography

The following background references are hereby incorporated herein by reference in their entirety:

[1] D. Comer and D. Stevens. Internetworking with TCP/IP. Prentice Hall, 1991.

[2] J. F. Patterson, R. D. Hill, S. L. Rohall, and W. S. Meeks, "Rendezvous: An architecture for Synchronous Multi-user Applications." CSCW 90: Proceedings of the Conference on Computer Supported Cooperative Work, ACM, pages 317–328 1990.

[3] Sun Microsystems, Java Development Kit (JDK). Version 1.0x

[4] K. Birman, A Schiper and P. Stephenson. "Lightweight causal and atomic group multicast". ACM TOCS, 9(3) :272–314, August 1991.

Having thus described our invention, what we claim as new and desire to secure by Letters Patent is:

1. A system for sharing application-specific events among a group of objects distributed over a network, comprising:

a plurality of clients comprising:

one or more distributable building blocks ("Components") of a collaborative application requiring support for shared state, said one or more Components including one or more shared object sets, wherein each Component may be executed independently and collaborate with other Components; each Component comprising a set of one or more Event Reaction Units (ERU);

each ERU having an associated precondition and a reaction; wherein the precondition specifies one or more reference events that trigger the reaction, wherein the reaction may perform any computation or task and may produce other events;

cloning and reinitialization means for correcting diverging state among the shared object sets; and a collaborative client middleware, communicatively coupled to the application and to the network, adapted to communicate to and receive from one or more remote clients over the network, asynchronous distributed shared events and deliver a received event to an associated Component.

2. The system of claim 1, further comprising:

context-sensitive state marshaling means for marshaling and unmarshaling clones of one or more shared objects in the shared object sets.

3. In a system wherein one or more distributable components of a collaborative application may be executed independently and collaborate with other Components and wherein each component includes a set of one or more event reaction units (ERU), a method for sharing events, comprising the steps of:

receiving a shared event from an application component over a network;

comparing the received event with one or more preconditions associated with each ERU, wherein the precondition specifies one or more reference events that trigger a corresponding reaction;

triggering the reaction, which may perform any computation or task and may produce other events;

instantiating a collaborative team, said receiving comprising receiving a message wherein the message includes an event to be posted to a team:

identifying the event with an associated team descriptor;

dispatching the event to the associated team descriptor;

storing the event in a Shared Event Queue; and picking up events from the queue and dispatching the events to associated ERUs.

4. The method of claim 3 wherein the system is a client-server system, further comprising the steps of:

said receiving step comprising receiving from a client a post event to be posted to the team for the application; and the team descriptor communicating the post event to the server, in response to receiving the post event.

5. A program storage device readable by a machine, tangibly embodying a program of instructions executable by the machine to perform method steps for sharing events in a system wherein one or more distributable components of a collaborative application may be executed independently and collaborate with other components and wherein each component includes a set of one or more event reaction units (ERU), said method steps comprising:

receiving a shared event from an application component over a network;

comparing the received event with one or more preconditions associated with each ERU, wherein the precondition specifies one or more reference events that trigger a corresponding reaction;

triggering the reaction, which may perform any computation or task and may produce other events instantiating a collaborative team, said receiving comprising receiving a message wherein the message includes an event to be posted to a team, identifying the event with an associated team descriptor;

dispatching the event to the associated team descriptor;

storing the event in a Shared Event Queue; and picking up events from the queue and dispatching the events to associated ERUs.

6. The program storage device of claim 5, wherein the system is a client-server system, further comprising the steps of:

said receiving step comprising receiving from a client a post event to be posted to the team for the application; and the team descriptor communicating the post event to the server, in response to receiving the post event.

7. A system for sharing application-specific events among a group of objects distributed over a network, comprising:

a plurality of clients comprising:

one or more distributable building blocks ("Components") of a collaborative application, wherein each Component may be executed independently and collaborate with other Components; each Component comprising a set of one or more Event Reaction Units ("ERU");

each ERU having an associated precondition and a reaction; wherein the precondition specifies one or more reference events that trigger the reaction, wherein the reaction may perform any computation or task and may produce other events;

a collaborative client middleware, communicatively coupled to the application and to the network, adapted to communicate to and receive from one or more remote clients over the network, asynchronous distributed shared events and deliver a received event to an associated Component; and an event batching framework, comprising:

means for posting the event to the set of ERUs; and a late event modifier ("LEM"), the LEM modifying the event objects after posting them to the set of ERUs.

8. A system for sharing application-specific events among a group of objects distributed over a network, comprising:

a plurality of clients comprising:

one or more distributable building blocks ("Components") of a collaborative application requiring support for shared state, said one or more Components including one or more shared object sets, wherein each Component may be executed independently and collaborate with other Components; each Component comprising a set of one or more Event Reaction Units ("ERU");

each ERU having an associated precondition and a reaction; wherein the precondition specifies one or more reference events that trigger the reaction, wherein the reaction may perform any computation or task and may produce other events;

a collaborative client middleware, communicatively coupled to the application and to the network, adapted to communicate to and receive from one or more remote clients over the network, asynchronous distributed shared events and deliver a received event to an associated Component; and conflict detection means for detecting conflicts due to incorrectly ordered updates to a shared object and informing the application.

9. A system for sharing application-specific events among a group of objects distributed over a network, comprising:

a plurality of clients comprising:

one or more distributable building blocks ("Components") of a collaborative application requiring support for shared state, said one or more Components including one or more shared object sets, wherein each Component may be executed independently and collaborate with other Components; each Component comprising a set of one or more Event Reaction Units ("ERU");

each ERU having an associated precondition and a reaction; wherein the precondition specifies one or more reference events that trigger the reaction, wherein the reaction may perform any computation or task and may produce other events;

a collaborative client middleware, communicatively coupled to the application and to the network, adapted to communicate to and receive from one or more remote clients over the network, asynchronous distributed shared events and deliver a received event to an associated Component; and context-sensitive state marshaling means for propagating state to one or more new or updated shared objects in the shared object sets.

10. In a system wherein one or more distributable components of a collaborative application may be executed independently and collaborate with other Components and wherein each component includes a set of one or more event reaction units ("ERU"), a method for sharing events, comprising the steps of:

receiving a shared event from an application component over a network;

comparing the received event with one or more preconditions associated with each ERU, wherein the precondition specifies one or more reference events that trigger a corresponding reaction;

triggering the reaction, which may perform any computation or task and may produce other events;

posting the event to the set of ERUs; and modifying the event after posting it to the set of ERUs.

11. In a system wherein one or more distributable components of a collaborative application requiring support for shared state may be executed independently and collaborate with other Components and wherein each component includes a set of one or more event reaction units ("ERU") and one or more shared object sets, a method for sharing events, comprising the steps of:

receiving a shared event from an application component over a network;

comparing the received event with one or more preconditions associated with each ERU, wherein the precondition specifies one or more reference events that trigger a corresponding reaction;

triggering the reaction, which may perform any computation or task and may produce other events;

detecting conflicts due to incorrectly ordered updates to a shared object; and informing the application, in response to said detecting step.

12. In a system wherein one or more distributable components of a collaborative application requiring support for shared state may be executed independently and collaborate with other Components and wherein each component includes a set of one or more event reaction units ("ERU") and one or more shared object sets, a method for sharing events, comprising the steps of:

receiving a shared event from an application component over a network;

comparing the received event with one or more preconditions associated with each ERU, wherein the precondition specifies one or more reference events that trigger a corresponding reaction;

triggering the reaction, which may perform any computation or task and may produce other events; and marshaling and propagating context-sensitive state to one or more new or updated shared objects in the shared object sets.

13. In a system wherein one or more distributable components of a collaborative application requiring support for shared state may be executed independently and collaborate with other Components and wherein each component includes a set of one or more event reaction units ("ERU") and one or more shared object sets, a method for sharing events, comprising the steps of:

receiving a shared event from an application component over a network;

comparing the received event with one or more preconditions associated with each ERU, wherein the precondition specifies one or more reference events that trigger a corresponding reaction;

triggering the reaction, which may perform any computation or task and may produce other events;

detecting diverging state among the shared object sets; and cloning and reinitializing diverging state among the shared object sets.

14. The method of claim 13, further comprising the step of:

marshaling and unmarshaling clones of one or more shared objects in the shared object sets.

15. The method of claim 13, wherein said cloning and reinitializing step further comprises the steps of:

making a copy of a subset of objects in the set and preserving pointers from inside the original subsets to objects outside the cloned subset;

mapping references between objects inside the original subset into the cloned subset;

exporting the cloned subset to other clients; and re-initializing the subset of objects based on the cloned subset, in response to said exporting step.

16. A program storage device readable by a machine, tangibly embodying a program of instructions executable by the machine to perform method steps for sharing events in a system wherein one or more distributable components of a collaborative application may be executed independently and collaborate with other components and wherein each component includes a set of one or more event reaction units ("ERU"), said method steps comprising:

receiving a shared event from an application component over a network;

comparing the received event with one or more preconditions associated with each ERU, wherein the precondition specifies one or more reference events that trigger a corresponding reaction;

triggering the reaction, which may perform any computation or task and may produce other events;

posting the event to the set of ERUs; and modifying the event after posting it to the set of ERUs.

17. A program storage device readable by a machine, tangibly embodying a program of instructions executable by the machine to perform method steps for sharing events in a system wherein one or more distributable components of a collaborative application requiring support for shared state may be executed independently and collaborate with other components and wherein each component includes a set of one or more event reaction units ("ERU") and one or more shared object sets, said method steps comprising:

receiving a shared event from an application component over a network;

comparing the received event with one or more preconditions associated with each ERU, wherein the precondition specifies one or more reference events that trigger a corresponding reaction;

triggering the reaction, which may perform any computation or task and may produce other events;

detecting conflicts due to incorrectly ordered updates to a shared object; and informing the application, in response to said detecting step.

18. A program storage device readable by a machine, tangibly embodying a program of instructions executable by the machine to perform method steps for sharing events in a system wherein one or more distributable components of a collaborative application requiring support for shared state may be executed independently and collaborate with other components and wherein each component includes a set of one or more event reaction units ("ERU") and one or more shared object sets, said method steps comprising:

receiving a shared event from an application component over a network;

comparing the received event with one or more preconditions associated with each ERU, wherein the precondition specifies one or more reference events that trigger a corresponding reaction;

triggering the reaction, which may perform any computation or task and may produce other events; and marshaling and propagating context-sensitive state to one or more new or updated shared objects in the shared object sets.

19. A program storage device readable by a machine, tangibly embodying a program of instructions executable by the machine to perform method steps for sharing events in a system wherein one or more distributable components of a collaborative application requiring support for shared state may be executed independently and collaborate with other components and wherein each component includes a set of one or more event reaction units ("ERU") and one or more shared object sets, said method steps comprising:

receiving a shared event from an application component over a network;

comparing the received event with one or more preconditions associated with each ERU, wherein the precondition specifies one or more reference events that trigger a corresponding reaction;

triggering the reaction, which may perform any computation or task and may produce other events;

detecting diverging state among the shared object sets; and cloning and reinitializing diverging state among the shared object sets.

20. The program storage device of claim 19, further comprising the step of:

marshaling and unmarshaling clones of one or more shared objects in the shared object sets.

21. The program storage device of claim 19, wherein said cloning and reinitializing step further comprises the steps of:

making a copy of a subset of objects in the set and preserving pointers from inside the original subsets to objects outside the cloned subset;

mapping references between objects inside the original subset into the cloned subset;

exporting the cloned subset to other clients; and re-initializing the subset of objects based on the cloned subset, in response to said exporting step.

* * * * *